(12) United States Patent
Du et al.

(10) Patent No.: US 8,731,889 B2
(45) Date of Patent: May 20, 2014

(54) MODELING HYDRAULIC FRACTURING INDUCED FRACTURE NETWORKS AS A DUAL POROSITY SYSTEM

(75) Inventors: Changan Mike Du, Plano, TX (US); Xu Zhang, Katy, TX (US); Debbie Fullilove, Brookshire, TX (US); Bradley John Hay, Edmond, OK (US); Keith Tushingham, Houston, TX (US); Lang Zhan, Pearland, TX (US); Hongren Gu, Sugar Land, TX (US); Joel Herve Le Calvez, Farmers Branch, TX (US); Walter Dee Grant, College Station, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 718 days.

(21) Appl. No.: 12/909,229

(22) Filed: Oct. 21, 2010

(65) Prior Publication Data
US 2011/0257944 A1 Oct. 20, 2011

Related U.S. Application Data

(60) Provisional application No. 61/310,833, filed on Mar. 5, 2010.

(51) Int. Cl.
*G06G 7/48* (2006.01)
(52) U.S. Cl.
USPC .......................................................... 703/10
(58) Field of Classification Search
None
See application file for complete search history.

(56) References Cited

U.S. PATENT DOCUMENTS

| | | | | |
|---|---|---|---|---|
| 7,788,037 B2 * | 8/2010 | Soliman et al. | ................. | 702/12 |
| 8,392,165 B2 * | 3/2013 | Craig et al. | .................... | 703/10 |
| 8,412,500 B2 * | 4/2013 | Weng et al. | .................... | 703/10 |
| 8,498,852 B2 * | 7/2013 | Xu et al. | ........................ | 703/10 |
| 2008/0164021 A1 * | 7/2008 | Dykstra | .................... | 166/250.1 |
| 2010/0256964 A1 | 10/2010 | Lee et al. | | |

OTHER PUBLICATIONS

Du et al., "A Workflow for Integrated Barnett Shale Gas Reservoir Modeling and Simulation", SPE 122934, 2009 SPE Latin American and Caribbean Petroleum Engineering Conference, 2009, pp. 1-12.*
Parshall, "Barnett Shale Showcases Tight-Gas Development," JPT, Sep. 2008, pp. 48-55.*
Walton, Ian C. and Erkal, Alpay, "Evaluation of Shale Gas Productivity Using a New Asymptotic Model," SPE 120577, 2009 SPE Production and Operations Symposium, Apr. 4-8, 2009, pp. 1-5, Oklahoma, OK, USA.

(Continued)

*Primary Examiner* — Thai Phan
*Assistant Examiner* — Herng-Der Day

(57) ABSTRACT

A method for calibrating fracture networks. The method includes estimating an average fracture width of a fracture network using one or more of net fracturing pressure, Poisson's ratio, shear modulus, and fracture height; determining microseismic event envelope and base intensity data using a three-dimensional geomodel including microseismic event data; and determining hydraulic fracturing treatment (HFT) fracture intensity of post-hydraulic fracturing treatment (post-HFT) based on the average fracture width and HFT volume data. The method further includes calibrating the base intensity data to the HFT fracture intensity to obtain calibrated HFT fracture intensity, determining a proppant transportation and distribution scenario, and generating a dual porosity reservoir model based on the calibrated HFT fracture intensity and the proppant transportation and distribution scenario.

20 Claims, 10 Drawing Sheets

(56) References Cited

OTHER PUBLICATIONS

Daniels, J., et al., "Contacting More of the Barnett Shale Through an Integration of Real-Time Microseismic Monitoring, Petrophysics, and Hydraulic Fracture Design," SPE 110562, 2007 SPE ATCE, Oct. 12-14, 2007, pp. 1-12, Anaheim, CA, USA.

Frantz Jr., J.H., et al, "Evaluating Barnett Shale Production Performance Using an Integrated Approach," SPE 96917, 2005 SPE ATCE, Oct. 9-12, 2005, pp. 1-18, Dallas, TX, USA.

Le Calvez, J. H, et al, "Using Induced Microseismicity to Monitor Hydraulic Fracture Treatment: A Tool to Improve Completion Techniques and Reservoir Management," SPE 104570, 2006 SPE Eastern Regional Meeting, Oct. 11-13, 2006, pp. 1-9, Canton OH, USA.

Le Calvez, J.H., et al., "Real-Time Microseismic Monitoring of Hydraulic Fracture Treatment: A Tool to Improve Completion and Reservoir Management," SPE 106159, 2007 SPE Hydraulic Fracturing Technology Conference, Jan. 29-31, 2007, pp. 1-7, College Station, TX, USA.

Mayerhofer, M.J., et al., "What is Stimulated Reservoir Volume (SRV)?" SPE 119890, 2008 SPE Shale Gas Production Conference, Nov. 16-18, 2008, pp. 1-14, Fort Worth, TX, USA.

Warpinski, N.R., et al., "Stimulating Unconventional Reservoirs: Maximizing Networkgrowth while Optimizing Fracture Conductivity," SPE 114173, 2008 SPE Unconventional Reservoirs Conference, Feb. 10-12, 2008, pp. 1-19, Keystone, CO, USA.

Xu, W., et al., "Characterization of Hydraulically-Induced Fracture Network Using Treatment and Microseismic Data in a Tight-Gas Sand Formation: a Geomechanical Approach,", SPE 125237, 2009 SPE Applied Technical Workshop, Jun. 15-17, 2009, pp. 1-5, San Antonio, TX, USA.

Schlumberger, : "Improve Fracture Placement Using StimMap Data," 2008, pp. 1-2.

Li, et al., "Critical Evaluation of Shale Gas Reservoir Simulation Approaches: Single-Porosity and Dual Porosity Modeling," SPE 141756, SPE Middle East Unconventional Gas Conference and Exhibition, Muscat, Oman, Jan. 31-Feb. 2, 2011, 15 pages.

Du et al., Generalization of Dual-Porosity System Representation for Hydraulic Fracturing-Stimulated Shale Reservoir (Part 2): Modeling, Simulation Workflow, and History Matching Studies, SPE 145752, SPE Asia Pacific Oil and Gas Conference and Exhibition, Jakarta, Indonesia, Sep. 20-22, 2011, 18 pages.

Du, et al., "Generalization of Dual-Porosity-System Representation and Reservoir Simulation of Hydraulic Fracturing-Stimulated Shale Gas Reservoirs," SPE 146534, SPE Annual Technical Conference and Exhibition, Denver, Colorado, Oct. 30-Nov. 2, 2011, 19 pages.

Fisher et al., "SPE 77441: Integrating Fracture Mapping Technologies to Optimize Stimulations in the Barnett Shale," SPE International, 2002: pp. 1.7.

Gale et al., "Natural fractures in the Barnett Shale and their importance for hydraulic fracture treatments," AAPG Bulletin, Apr. 2007, vol. 91(4): pp. 603-622.

Ketter et al., "SPE 103232: A Field Study Optimizing Completion Strategies for Fracture Initiation in Barnett Shale Horizontal Wells," SPE International, 2006: pp. 1-6.

King et al., "SPE 119896: Increasing Fracture Path Complexity and Controlling Downward Fracture Growth in the Barnett Shale," SPE International, 2008: pp. 1-8.

Loucks et al., "Mississippian Barnett Shale: Lithofacies and depositional setting of a deep-water shale-gas succession in the Fort Worth Basin, Texas," AAPG Bulletin, Apr. 2007, vol. 91(4): pp. 579-601.

Slatt et al., "SPE 119891: Workflow for Stratigraphic Characterization of Unconventional Gas Shales," SPE International, 2008: pp. 1-17.

Waters et al., "SPE 119635: Simultaneous Hydraulic Fracturing of Adjacent Horizontal Wells in the Woodford Shale," SPE International, 2009: pp. 1-22.

\* cited by examiner

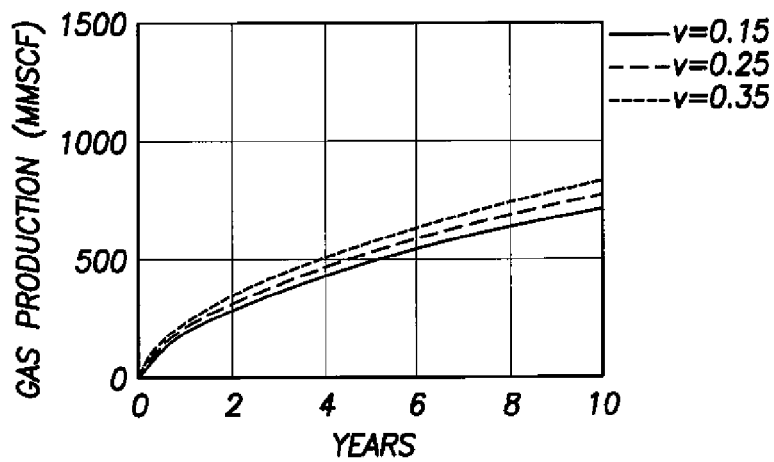
FIG.6.1
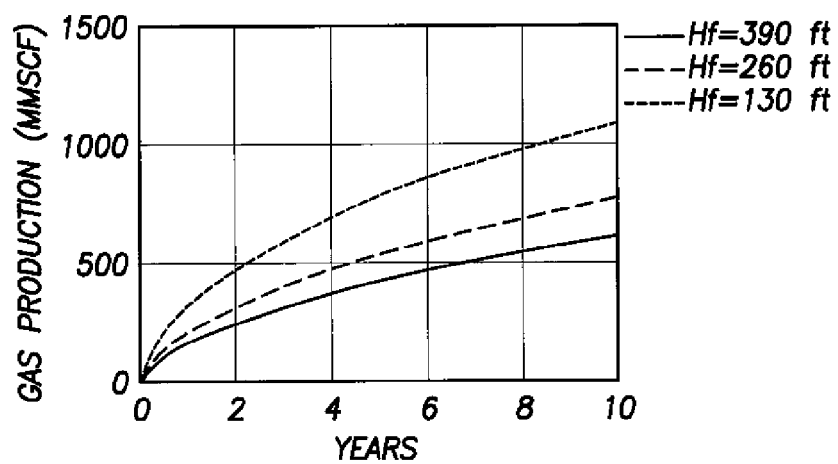
FIG.6.2
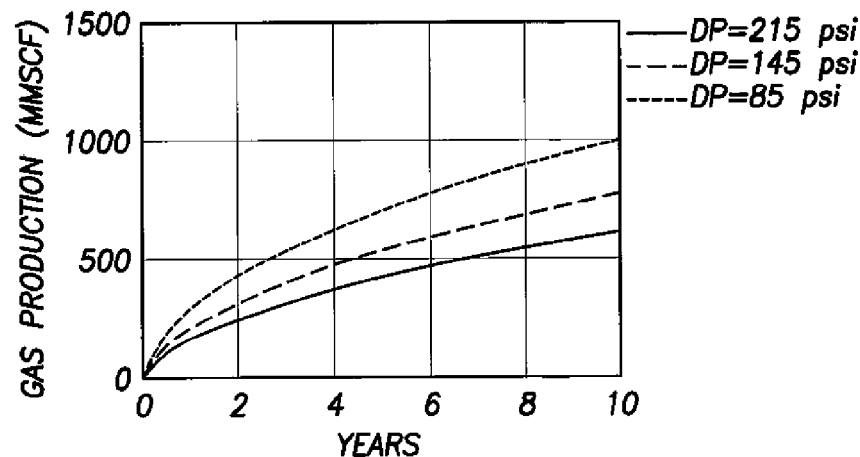
FIG.6.3

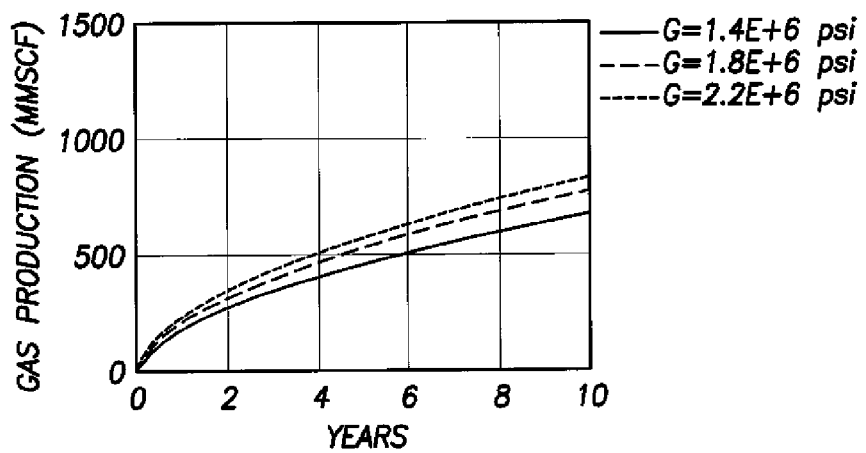
FIG.6.4
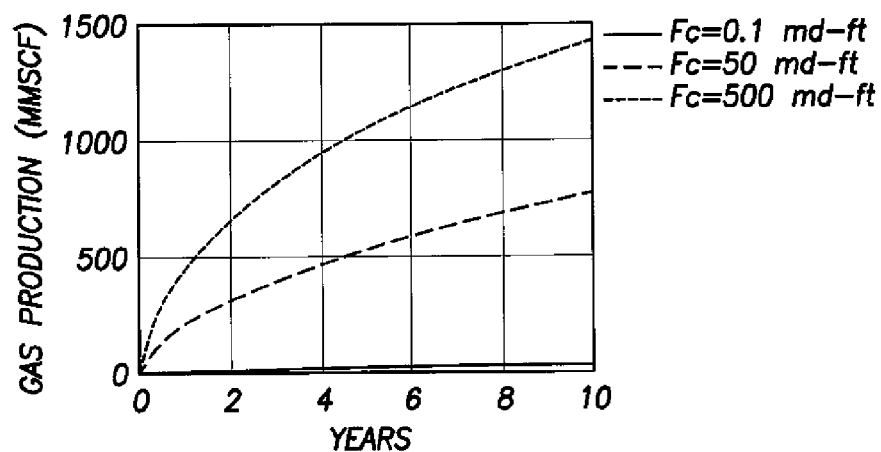
FIG.6.5
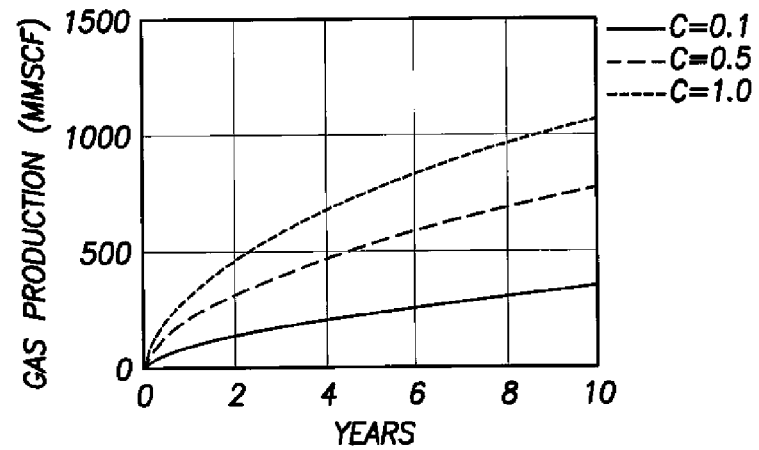
FIG.6.6

FIG.6.7
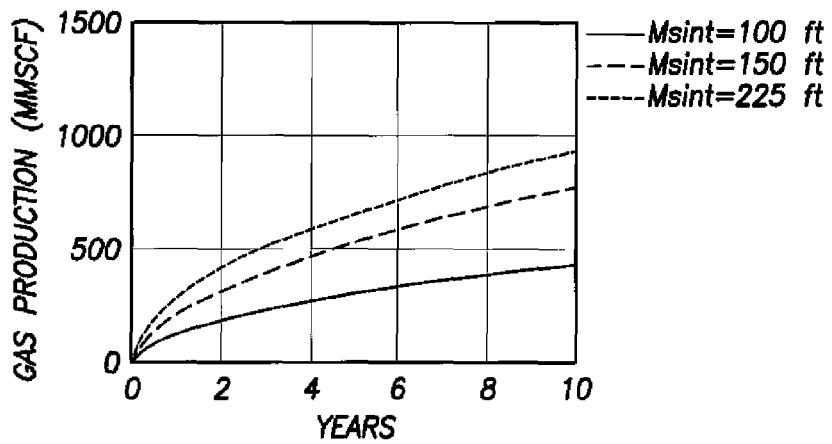
FIG.6.8
| SENSITIVITY PARAMETERS | | |
|---|---|---|
| VARIABLE | Min | Max |
| v | 0.15 | 0.35 |
| Hf | 130 | 390 |
| DP | 85 | 215 |
| G | 1.4E+6 | 2.2e+6 |
| Fc | .1 | 200 |
| C | 0.1 | 1 |
| Msint | 100 | 225 |
FIG.6.9
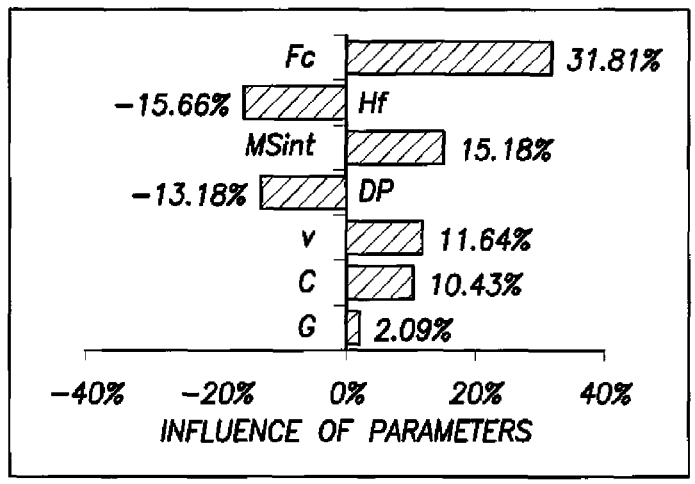

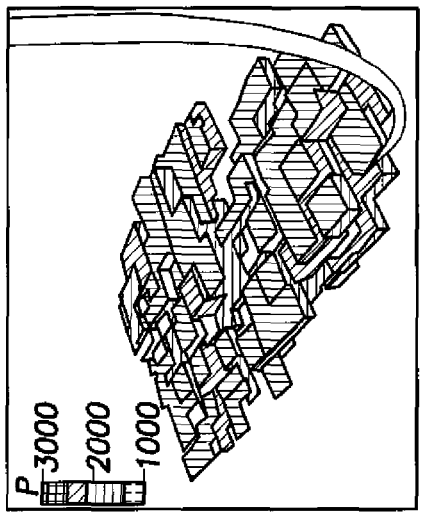
*FIG.7.3*
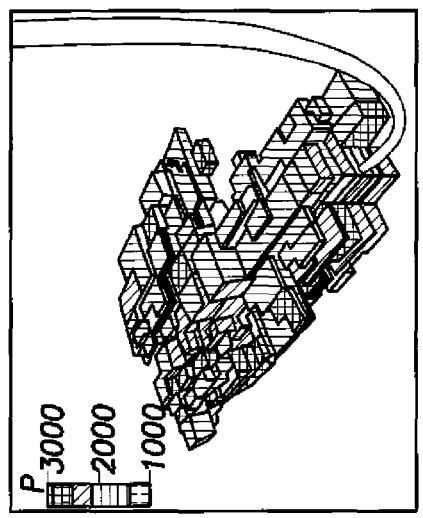
*FIG.7.2*
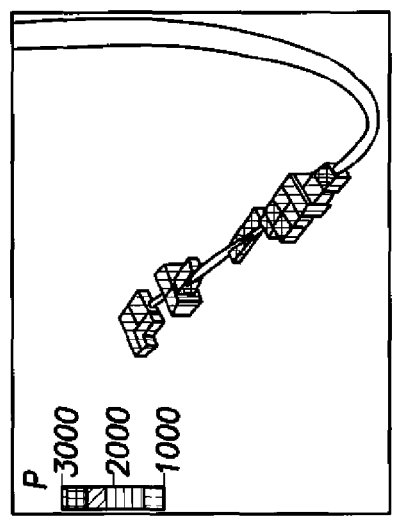
*FIG.7.1*

MODELING HYDRAULIC FRACTURING INDUCED FRACTURE NETWORKS AS A DUAL POROSITY SYSTEM

CROSS-REFERENCE TO RELATED APPLICATION

This application claims priority, pursuant to 35 U.S.C. §119(e), to the filing date of U.S. Patent Application Ser. No. 61/310,833, entitled "Calibration of Fracture Networks Induced by Hydraulic Fracturing," filed on Mar. 5, 2010, which is hereby incorporated by reference in its entirety.

BACKGROUND

Driven by gas consumption demand and rising oil and gas prices in the past several years, shale gas production has gained momentum and initiated a new era for gas production. The characteristics of shale reservoirs may typically be described as having extremely low permeability (100-600 nano-darcys), low porosity (2-10%), and moderate gas adsorption (gas content 50-150 scf/ton). In order to achieve economical production and enhance productivity, large numbers of horizontal wells and massive multistage hydraulic fracturing treatment (HFT) jobs have been performed in a shale reservoir. Due to the complex nature of the shale reservoirs, which are vastly different from conventional or other types of unconventional reservoirs, it is difficult to obtain a clear understanding and an accurate description of the shale reservoir.

In view of the above, various operational practices have been tested in the field; and a variety of geophysical and petrophysical data were acquired, cores were tested in labs; and especially microseismic (MS) mapping has been performed to improve the understanding of the hydraulic fracturing induced or post-hydraulic fracturing (PHF) fracture system characteristics. Further, geomechanical modeling (e.g., properties and stress) can also offer insight for well path and completion design. With a complex shale gas development system, a general workflow and data integration process for shale gas reservoir modeling and reservoir simulation would allow for integration of various data, performing of various analysis, evaluation of the inter-relationship of different operations and, thus, improving the understanding of shale gas reservoir characteristics and offer a quantitative means and platform for optimizing shale gas production. Also, a solution for proper modeling of hydraulic fracturing induced fracture network with MS and HFT execution data would allow for a better understanding of the PHF system, production mechanism, reservoir drainage estimation, and refracturing design.

SUMMARY

In one or more implementations of modeling hydraulic fracturing induced fracture networks as a dual porosity system, the method includes estimating an average fracture width of a fracture network using one or more of net fracturing pressure, Poisson's ratio, shear modulus, and fracture height; determining microseismic event envelope and base intensity data using a three-dimensional geomodel including microseismic event data; and determining hydraulic fracturing treatment (HFT) fracture intensity of post-hydraulic fracturing (post-HFT) based on the average fracture width and HFT volume data. The method further includes calibrating the base intensity data to the HFT fracture intensity to obtain calibrated HFT fracture intensity, determining a proppant transportation and distribution scenario, and generating a dual porosity reservoir model based on the calibrated HFT fracture intensity and the proppant transportation and distribution scenario.

Other aspects of modeling hydraulic fracturing induced fracture networks as a dual porosity system will be apparent from the following description and the appended claims.

BRIEF DESCRIPTION OF DRAWINGS

It is to be noted that the appended drawings illustrate only typical embodiments and are therefore not to be considered limiting of the scope of modeling hydraulic fracturing induced fracture networks as a dual porosity system, which may admit to other equally effective embodiments.

FIGS. 6.1-6.9 and 7.1-7.3 depict examples of fracture modeling simulation results with uncertainty parameters.

DESCRIPTION

Figure 1:
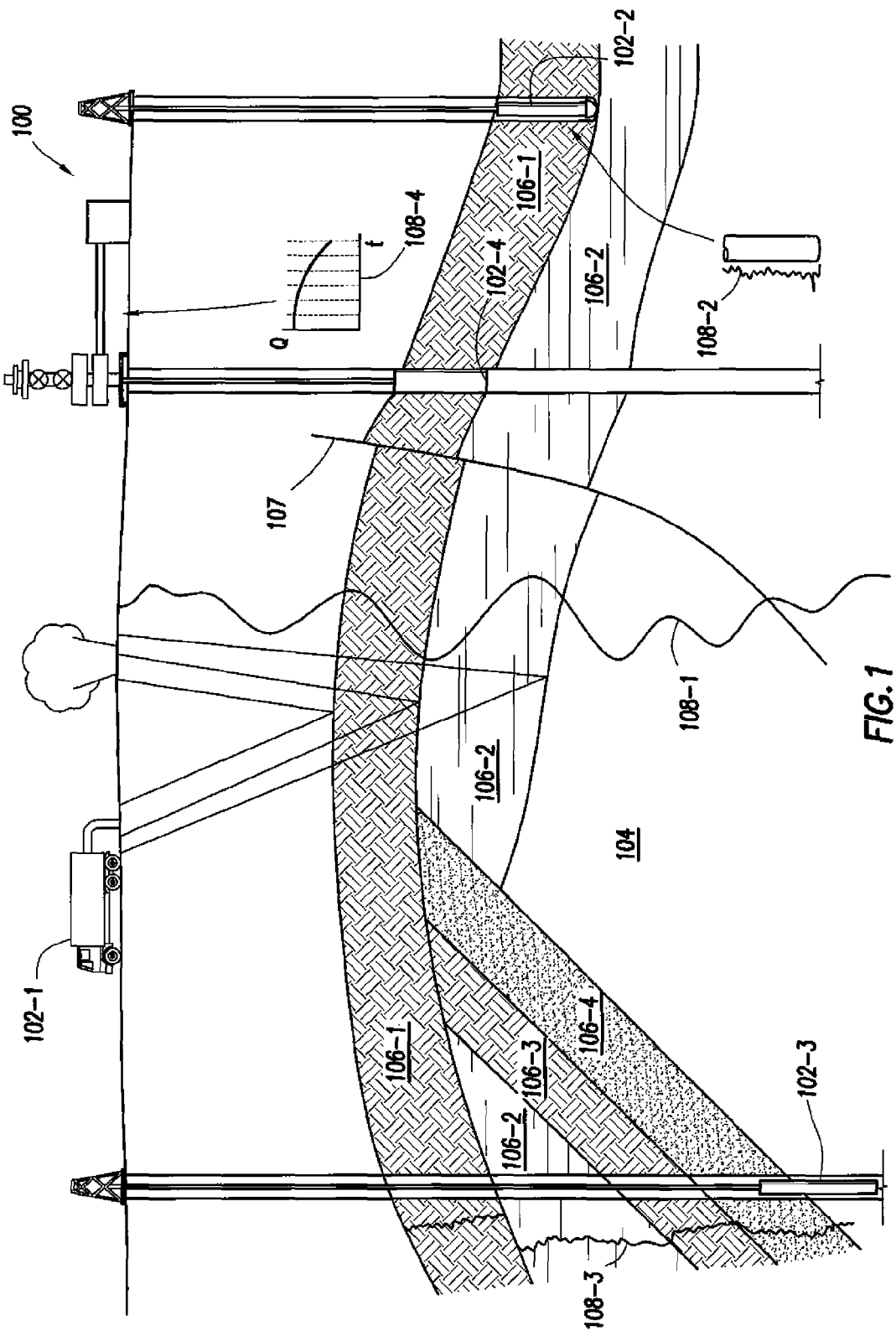
FIG. 1 is a schematic view, partially in cross section of an oilfield having a plurality of data acquisition tools positioned at various locations along the oilfield for collecting data from the subterranean formations.

Specific embodiments of modeling hydraulic fracturing induced fracture networks as a dual porosity system will now be described in detail with reference to the accompanying figures. Like elements in the various figures are denoted by like reference numerals for consistency.

In the following detailed description of embodiments of modeling hydraulic fracturing induced fracture networks as a dual porosity system, numerous specific details are set forth in order to provide a more thorough understanding of modeling hydraulic fracturing induced fracture networks as a dual porosity system. In other instances, well-known features have not been described in detail to avoid obscuring the described embodiments.

The embodiments of modeling hydraulic fracturing induced fracture networks as a dual porosity system provide a system and a method for modeling HFT induced fracture networks and shale gas reservoirs as a dual porosity system. Specifically, in one or more embodiments, microseismic (MS) events, natural fracture intensity/density and fracture job data, and/or geological modeling may be used instead of the unknown complex interaction between a fracture job process and the description of a shale reservoir's geological, geophysical and petrophysical characteristics and geomechanical factors to characterize induced fracture networks and history-match production responses. Further, a practical methodology may be used to estimate induced fracture networks from HFT using MS events and/or "natural fracture" intensity and fracture job data. In this case, MS responses may be used to delineate HFT stimulated volumes. Further, MS events and/or natural fracture intensity provide an initial estimation of HFT fracture intensity/density which may be further calibrated using HFT job data. In one or more embodiments, major physical constraints such as fracture fluid mass conservation, interpreted HFT main fractures, and spatial heterogeneity of HFT fracture network intensity may be incorporated by calibrating the fracture network. With a scenario assessment (i.e., the dominant mechanism of fracture development such as through microseismic interpretation of main fractures), proppant distribution may also be established. At this stage, an equivalent dual porosity reservoir model may be generated for production history-matching and uncertainty analysis. The dual porosity reservoir model may allow for single well production history matching and forecasting and for field scale studies.

FIG. 1 depicts a schematic view, partially in cross section of a field (100) having data acquisition tools (102-1), (102-2), (102-3), and (102-4) positioned at various locations in the field for gathering data of a subterranean formation (104). As shown, the data collected from the tools (102-1 through 102-4) can be used to generate data plots (108-1 through 108-4), respectively.

As shown in FIG. 1, the subterranean formation (104) includes several geological structures (106-1 through 106-4). As shown, the formation has a sandstone layer (106-1), a limestone layer (106-2), a shale layer (106-3), and a sand layer (106-4). A fault line (107) extends through the formation. In one or more embodiments, the static data acquisition tools are adapted to measure the formation and detect the characteristics of the geological structures of the formation.

As shown in FIG. 1, a drilling operation is depicted as being performed by drilling tools (102-2) suspended by a rig and advanced into the subterranean formations (104) to form a wellbore. The drilling tools may be adapted for measuring downhole properties using logging-while-drilling ("LWD") tools.

A surface unit (not shown) is used to communicate with the drilling tools (102-2) and/or offsite operations. The surface unit is capable of communicating with the drilling tools (102-2) to send commands to the drilling tools (102-2), and to receive data therefrom. The surface unit is preferably provided with computer facilities for receiving, storing, processing, and/or analyzing data from the oilfield. The surface unit collects data generated during the drilling operation and produces data output which may be stored or transmitted. Computer facilities, such as those of the surface unit, may be positioned at various locations about the oilfield and/or at remote locations.

Sensors, such as gauges, may be positioned about the oilfield to collect data relating to various oilfield operations as described previously. For example, the sensor may be positioned in one or more locations in the drilling tools (102-2) and/or at the rig to measure drilling parameters, such as weight on bit, torque on bit, pressures, temperatures, flow rates, compositions, rotary speed, and/or other parameters of the oilfield operation.

The data gathered by the sensors may be collected by the surface unit and/or other data collection sources for analysis or other processing. The data collected by the sensors may be used alone or in combination with other data. The data may be collected in one or more databases and/or transmitted on or offsite. All or select portions of the data may be selectively used for analyzing and/or predicting oilfield operations of the current and/or other wellbores. The data may be historical data, real time data, or combinations thereof. The real time data may be used in real time, or stored for later use. The data may also be combined with historical data or other inputs for further analysis. The data may be stored in separate databases, or combined into a single database.

The collected data may be used to perform activities, such as wellbore steering. In another example, the seismic data output may be used to perform geological, geophysical, and/or reservoir engineering. In this example, the reservoir, wellbore, surface and/or process data may be used to perform reservoir, wellbore, geological, and geophysical or other simulations. The data outputs from the oilfield operation may be generated directly from the sensors, or after some preprocessing or modeling. These data outputs may act as inputs for further analysis.

As shown in FIG. 1, data plots (108-1 through 108-4) are examples of plots of static properties that may be generated by the data acquisition tools (102-1 through 102-4), respectively. For example, data plot (108-1) is a seismic two-way response time. In another example, data plot (108-2) is core sample data measured from a core sample of the formation (104). In another example, data plot (108-3) is a logging trace. In another example, data plot (108-4) is a plot of a dynamic property, the fluid flow rate over time. Those skilled in the art will appreciate that other data may also be collected, such as, but not limited to, historical data, user inputs, economic information, other measurement data, and other parameters of interest.

While a specific subterranean formation (104) with specific geological structures is depicted, it will be appreciated that the formation may contain a variety of geological structures. Fluid, rock, water, oil, gas, and other geomaterials may also be present in various portions of the formation. Each of the measurement devices may be used to measure properties of the formation and/or its underlying structures. While each acquisition tool is shown as being in specific locations along the formation, it will be appreciated that one or more types of measurement may be taken at one or more location across one or more fields or other locations for comparison and/or analysis using one or more acquisition tools. The terms measurement device, measurement tool, acquisition tool, and/or field tools are used interchangeably in this document based on the context.

The data collected from various sources, such as the data acquisition tools of FIG. 1, may then be evaluated. Typically, seismic data displayed in the data plot (108-1) from the data acquisition tool (102-1) is used by a geophysicist to determine characteristics of the subterranean formation (104). Core data shown in plot (108-2) and/or log data from the well log (108-3) is typically used by a geologist to determine various characteristics of the geological structures of the subterranean formation (104). Production data from the production graph (108-4) is typically used by the reservoir engineer to determine fluid flow reservoir characteristics.

Figure 2:
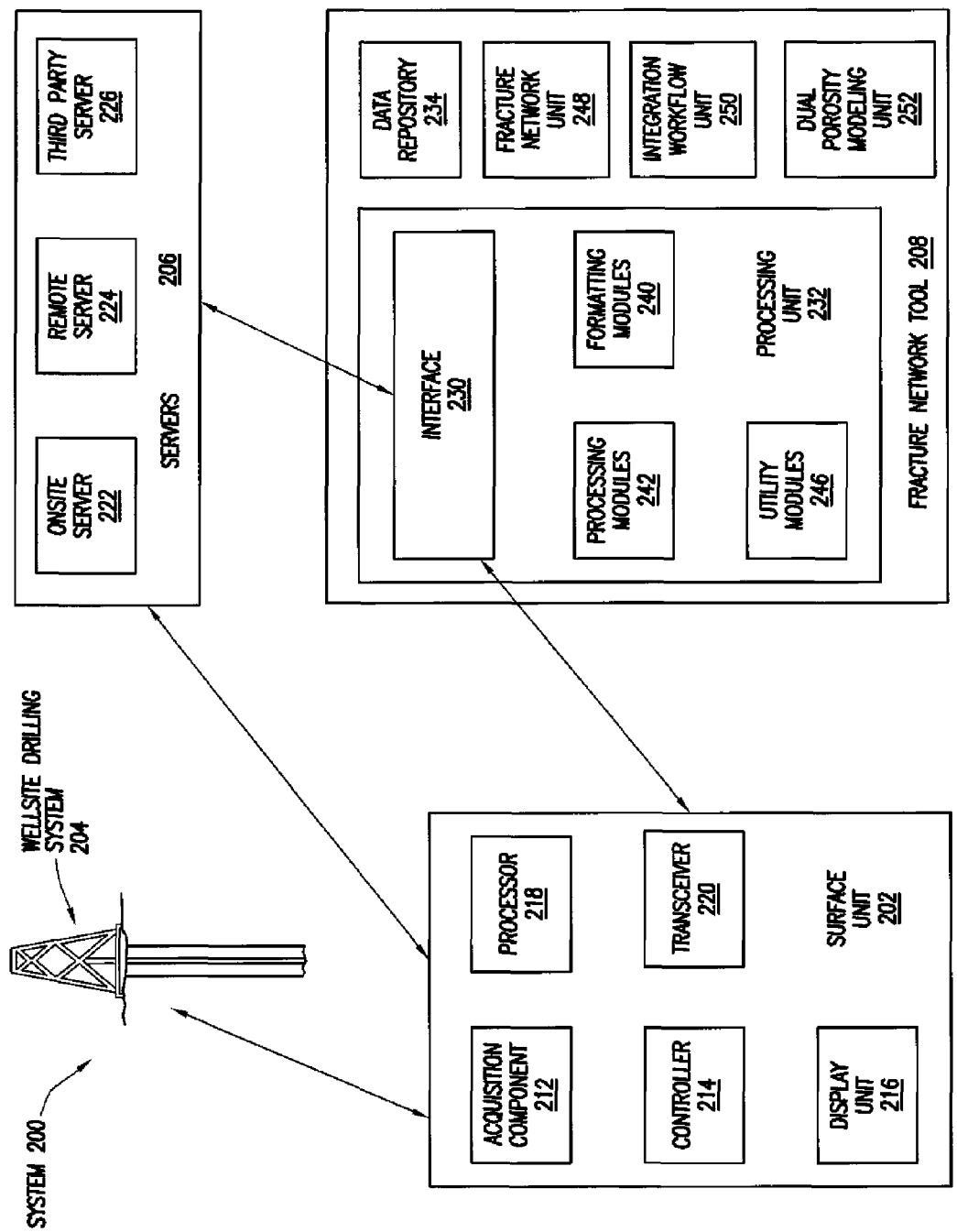
FIG. 2 depicts an example schematic diagram of a system for fracture modeling.

FIG. 2 depicts a system (200) incorporated with a portion of a field, as shown and described above with respect to FIG. 1. As shown, the system (200) includes a surface unit (202) operatively connected to a wellsite drilling system (204), servers (206), and a fracture tool (208) via an interface (230) on the fracture tool (208). The fracture tool (208) is also operatively linked, via the interface (230), to the servers (206). The surface unit (202) and wellsite drilling system (204) may include various field tools and wellsite facilities. As shown, communication links are provided between the surface unit (202) and the wellsite drilling system (204), servers (206), and fracture tool (208). A communication link is also provided between the fracture tool (208) and the servers (206). A variety of links may be provided to facilitate the flow of data through the system (200). For example, the communication links may provide for continuous, intermittent, one-way, two-way, and/or selective communication throughout the system (200). The communication links may be of any type, including but not limited to wired and wireless.

In one or more embodiments, the wellsite drilling system (204) is configured to perform oilfield operations as described above with respect to FIG. 1. Specifically, the wellsite drilling system (204) may be configured to perform drilling operations as directed by a surface unit (202). In one or more embodiments, the surface unit (202) is provided with an acquisition component (212), a controller (214), a display unit (216), a processor (218), and a transceiver (220). The acquisition component (212) collects and/or stores data of the field. This data may be measured by sensors at the wellsite. This data may also be received from other sources, such as those described with respect to FIG. 1 above.

The controller (214) may be enabled to enact commands at the field. The controller (214) may be provided with actuation means that can perform drilling operations, such as steering, advancing, or otherwise taking action at the wellsite. Commands may be generated based on logic of the processor (218), or by commands received from other sources. In one or more embodiments, the processor (218) is provided with features for manipulating and analyzing the data. The processor (218) may be provided with additional functionality to perform field operations.

In one or more embodiments, a display unit (216) may be provided at the wellsite and/or remote locations for viewing field data (not shown). The field data represented by the display unit (216) may be raw data, processed data and/or data outputs generated from various data. In one or more embodiments, the display unit (216) is adapted to provide flexible views of the data, so that the screens depicted may be customized as desired. A user may plan, adjust, and/or otherwise perform field operations (e.g., determine the desired course of action during field operations) based on reviewing the displayed field data. The field operations may be selectively adjusted in response to viewing the data on the display unit (216). The display unit (216) may include a two-dimensional (2D) display or a three-dimensional (3D) display for viewing field data or various aspects of the field operations.

In one or more embodiments, the transceiver (220) provides a means for providing data access to and/or from other sources. The transceiver (220) may also provide a means for communicating with other components, such as the servers (206), the wellsite drilling system (204), the surface unit (202), and/or the fracture tool (208).

The servers (206) may be configured to transfer data from a surface unit (202) at one or more wellsites to the fracture tool (208). As shown, the servers (206) include an onsite server (222), a remote server (224), and a third party server (226). The onsite server (222) may be positioned at the wellsite and/or other locations for distributing data from the surface unit (202). As shown, the remote server (224) is positioned at a location away from the field and provides data from remote sources. The third party server (226) may be onsite or remote, but is often operated by a third party, such as a client.

In one or more embodiments, the servers (206) are capable of transferring data, such as logs, drilling events, trajectory, seismic data, historical data, economics data, other field data, and/or other data that may be of use during analysis. The type of server is not intended to limit modeling hydraulic fracturing induced fracture networks as a dual porosity system. In one or more embodiments, the system is adapted to function with any type of server that may be employed.

In one or more embodiments, the servers (206) communicate with the fracture tool (208) through the communication links. As indicated by the multiple arrows, the servers (206) may have separate communication links with the fracture tool (208) and the surface unit (202). One or more of the servers (206) may be combined or linked to provide a combined communication link.

In one or more embodiments, the servers (206) collect a wide variety of data. The data may be collected from a variety of channels that provide a certain type of data, such as well logs. The data from the servers is passed to the fracture tool (208) for processing. The servers (206) may also be configured to store and/or transfer data. For example, the data may be collected at the wellsite drilling system (204) using measurements-while-drilling (MWD) tools, logging-while-drilling (LWD) tools, any other similar types of drilling measurement tools, or any combination thereof. More specifically, the MWD tools and/or LWD tools may be configured to obtain acoustic measurements during drilling of the borehole at the wellsite drilling system (204). The LWD tool may be configured to obtain delta-T compressional measurements, delta-T shear measurements, compressional velocity, and/or shear velocity. For example, the LWD tool may correspond to a full quadrupole shear LWD tool capable of measuring both compressional velocity and shear velocity in real time during a drilling operation.

Those skilled in the art will appreciate that MWD tools are configured to evaluate physical properties during the drilling of a wellbore. A MWD tool may obtain measurements downhole, which may be stored and then transmitted to the surface. In this case, the measurements may be transmitting to the surface as pressure pulses in the mud system (e.g., positive, negative, or continuous sine waves). One skilled in the art will appreciate that MWD tools that measure formation parameters (resistivity, porosity, sonic velocity, gamma ray) are referred to as LWD tools. LWD tools may obtain, store, and transmit measurements as discussed above with respect to MWD tools.

In one or more embodiments, the fracture tool (208) is operatively linked to the surface unit (202) for receiving data therefrom. In some cases, the fracture tool (208) and/or server(s) (206) may be positioned at the wellsite. The fracture tool (208) and/or server(s) (206) may also be positioned at various locations. The fracture tool (208) may be operatively linked to the surface unit (202) via the server(s) (206). The fracture tool (208) may also be included in or located near the surface unit (202).

In one or more embodiments, the fracture tool (208) includes an interface (230), a processing unit (232), a data repository (234), and a data rendering unit (not shown). In one or more embodiments, the fracture network unit (248) of the fracture tool (208) is configured to monitor downhole properties for borehole steering. More specifically, the fracture network unit (248) may be configured to use downhole properties obtained by MWD tools and/or LWD tools at the wellsite drilling system (204) to determine an optimal direction for a drilling operation. In this case, the downhole properties may be obtained from the servers (206), where the wellsite drilling system (204) and surface unit (202) are configured to store the downhole properties in the servers (206) in real time.

In one or more embodiments, the fracture network unit (248) is configured to perform fracture modeling prior and/or subsequent to HFT. Specifically, the fracture network unit (248) may be configured to accurately characterize a fracture network based on a variety of reservoir property heterogeneity and engineering physical phenomena. For example, the fracture network unit (248) may decouple MS responses from complex reservoir characteristics and geomechanical factors, allowing for the estimation of an induced fracture network from a HFT. Further, the fracture network unit (248) may use MS responses to delineate stimulated volumes from the HFT. MS events and/or natural fracture intensity together with HFT job data and production history-matching analysis allow for the calibration of HFT fracture intensity, where the calibrated post-HFT fracture network may be used in production prediction.

Optionally, the fracture network unit (248) may be configured to continually update an earth model (e.g., a full field numerical model, a geostatistical model, etc.) based on the acoustic/electric measurements. In this case, the fracture network unit (248) may be configured to generate the optimal well trajectory using the updated earth model. Further, the earth model may initially be generated based on subsurface measurements as described above with respect to FIG. 1.

In one or more embodiments, the integration workflow unit (250) of the fracture tool (208) is configured to integrate data from various sources as discussed above for shale gas reservoir characterization and simulation. More specifically, the integration workflow unit (250) may specify a general workflow and data integration process for integrating the different data sources, performing various analysis, and evaluating the inter-relationship of different operations. For example, the integration workflow unit (250) may perform a scenario analysis to estimate different attributes for simulation.

In one or more embodiments, the dual porosity modeling unit (252) of the fracture tool (208) is configured to generate a discrete fracture network (DFN) using fracture intensity distribution and known fracture geometry from the fracture network unit (248), where additional processing is performed to obtain real fracture distribution parameters. In this case, the dual porosity modeling unit (252) may be configured to upscale the DFN system to a dual porosity/permeability reservoir model and then use simulator(s) to model the reservoir dynamics.

In one or more embodiments, the dual porosity modeling unit (252) may be configured to generate an optimal well path and path design based on the dual porosity/permeability reservoir model. More specifically, the dual porosity modeling unit (252) may generate an optimal well path and design to optimize production in the reservoir. For example, the dual porosity modeling unit (252) may generate an optimal HFT design based on natural fractures in the reservoir. In another example, the dual porosity modeling unit (252) may determine optimal parameters for producing a reservoir subsequent to a HFT. The optimal well path and design generated by the dual porosity modeling unit (252) may be used at the surface unit (202) to adjust a reservoir operation. In other words, the dual porosity modeling unit (252) may be configured to provide real time feedback, including an optimal well path and design generated based on an analysis of the discrete fracture network (DFN), to the surface unit (202), where a reservoir operation may be adjusted at the surface unit (202) accordingly.

In one or more embodiments, the interface (230) of the fracture tool (208) is configured to communicate with the servers (206) and the surface unit (202). The interface (230) may also be configured to communicate with other oilfield or non-oilfield sources. The interface (230) may be configured to receive the data and map the data for processing. In one or more embodiments, data from the servers (206) is sent along predefined channels, which may be selected by the interface (230).

As depicted in FIG. 2, the interface (230) selects the data channel of the server(s) (206) and receives the data. In one or more embodiments, the interface (230) also maps the data channels to data from the wellsite. The data may then be passed from the interface (230) to the processing modules (242) of the processing unit (232). In one or more embodiments, the data is immediately incorporated into the fracture tool (208) for real time sessions and/or modeling. The interface (230) may create data requests (e.g., surveys, logs, MWD/LWD data, etc.), display the user interface, and monitor connection state events. In one or more embodiments, the interface (230) also instantiates the data into a data object for processing.

In one or more embodiments, the processing unit (232) includes formatting modules (240), processing modules (242), and utility modules (246). These modules are configured to manipulate the field data for analysis, potentially in real time.

In one or more embodiments, the formatting modules (240) transform the data to a desired format for processing. Incoming data may be formatted, translated, converted, or otherwise manipulated for use. In one or more embodiments, the formatting modules (240) are configured to enable the data from a variety of sources to be formatted and used so that the data processes and displays in real time.

In one or more embodiments, the utility modules (246) provide support functions to the fracture tool (208). In one or more embodiments, the utility modules (246) include a logging component (not shown) and a user interface (UI) manager component (not shown). The logging component provides a common call for the logging data, which means that the utility modules (246) allow the logging destination to be set by the application. The logging component may also be provided with other features, such as a debugger, a messenger, and a warning system, among others. The debugger sends a debug message to those using the system. The messenger sends information to subsystems, users, and others. The information sent by the messenger may or may not interrupt the operation and may be distributed to various locations and/or users throughout the system. The warning system may be configured to send error messages and warnings to various locations and/or users throughout the system. In some cases, the warning messages may interrupt the process and display alerts.

In one or more embodiments, the UI manager component (not shown) creates user interface elements for displays. The UI manager component defines user input screens, such as menu items, context menus, toolbars, and settings windows. The UI manager may also be configured to direct events relating to these user input screens.

In one or more embodiments, the processing modules (242) are configured to analyze the data and generate outputs. As described above, the data analyzed by the processing modules (242) may include static data, dynamic data, historic data, real time data, or other types of data. Further, the data analyzed by the processing modules (242) may relate to various aspects of the field operations, such as formation structure, geological stratigraphy, core sampling, well logging, density, resistivity, fluid composition, flow rate, downhole condition, surface condition, equipment condition, or other aspects of the field operations. In one or more embodiments, the data is processed by the processing module (242) into multiple volume data sets for storage and retrieval.

In one or more embodiments, the data repository (234) stores the data for the fracture tool (208). The data stored in the data repository (234) may be in a format available for use in real time (e.g., information is updated at approximately the same rate that the information is received). In one or more embodiments, the data is passed to the data repository (234) from the processing modules (242). The data can be persisted in the file system (e.g., as an extensible markup language (XML) file) or in a database. The user, a computer program, or some other determining entity may determine which storage is the most appropriate to use for a given piece of data and stores the data in a manner to enable automatic flow of the data through the rest of the system in a seamless and integrated fashion. The system may also facilitate manual and automated workflows (e.g., Modeling, Geological, and Geophysical workflows) based upon the persisted data.

In one or more embodiments, the data rendering unit performs rendering algorithm calculations to provide one or more displays for visualizing the data. The displays for visualizing the data may be presented, using one or more communication links, to a user at the display unit (216) of the surface unit (202). The data rendering unit may contain a 2D canvas, a 3D canvas, a well section canvas, or other canvases, either by default or as selected by a user. The data rendering unit may selectively provide displays composed of any combination of one or more canvases. The canvases may or may not be synchronized with each other during display. In one or more embodiments, the data rendering unit is provided with mechanisms for actuating various canvases or other functions in the system. Further, the data rendering unit may selectively provide displays composed of any combination of one or more volume data sets. The volume data sets typically contain exploration and production data.

While specific components are depicted and/or described for use in the units and/or modules of the fracture tool (208), it will be appreciated that a variety of components with various functions may be configured to provide the formatting, processing, utility, and coordination functions necessary to process data in the fracture tool (208). The components may have combined functionalities and may be implemented as software, hardware, firmware, or suitable combinations thereof.

Further, components (e.g., the processing modules (242), the data rendering unit, etc.) of the fracture tool (208) may be located in an onsite server (222) or in distributed locations where a remote server (224) and/or a third party server (226) may be involved. The onsite server (222) may be located within the surface unit (202).

Figure 3:
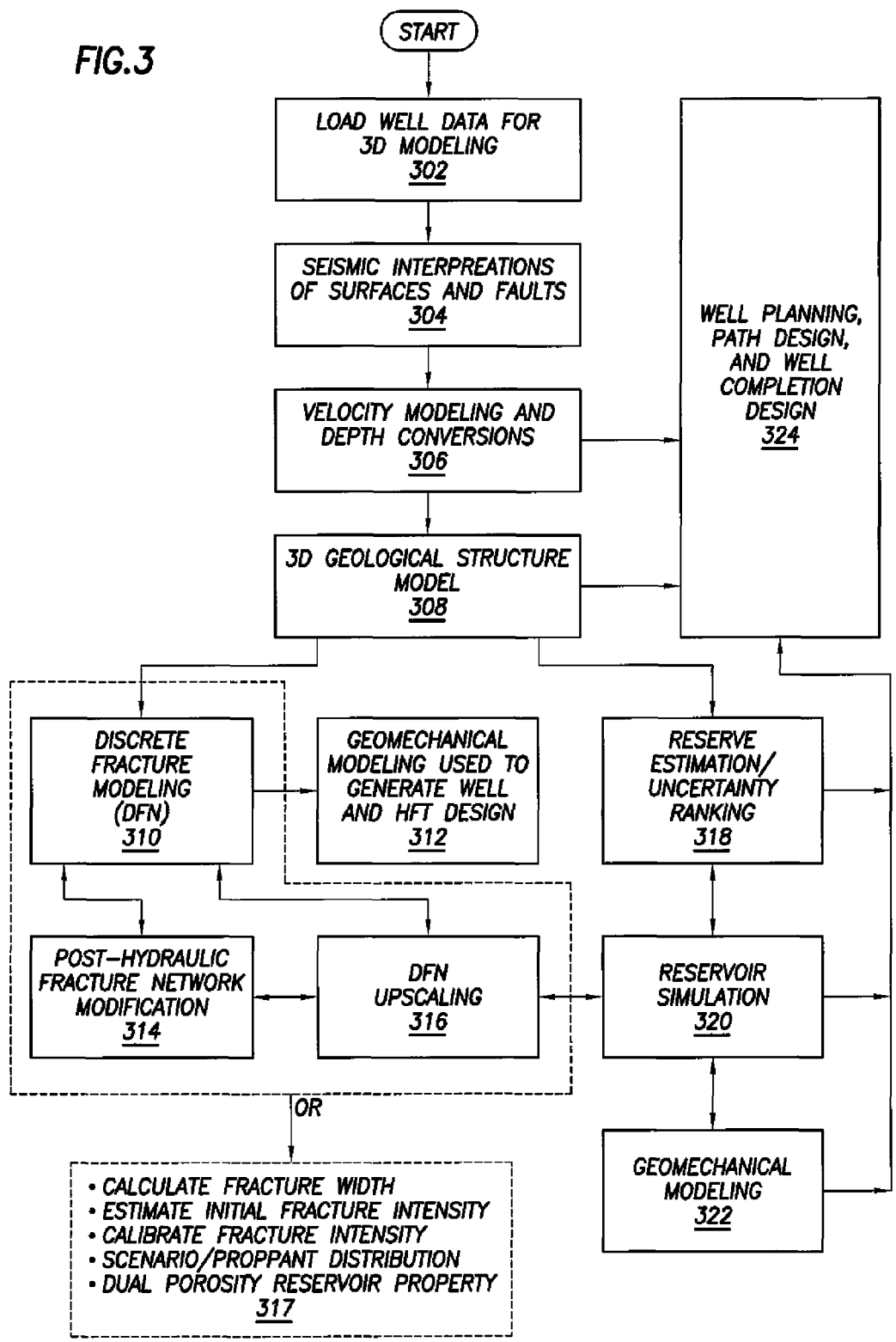
FIGS. 3-4 depict example flow charts of methods for fracture modeling.

FIG. 3 shows a flow chart depicting a method for fracture modeling. The method may be performed using, for example, the system of FIG. 2. In one or more embodiments, one or more of the steps shown in FIG. 3 may be omitted, repeated, and/or performed in a different order than the order shown in FIG. 3. Accordingly, the scope of modeling hydraulic fracturing induced fracture networks as a dual porosity system should not be considered limited to the specific arrangement of steps shown in FIG. 3.

In element 302, well data may be loaded for 3D modeling. For example, the data listed below in Table 1 may be obtained for 3D modeling.

TABLE I

Examples of Barnett Shale Gas Reservoir Modeling and Simulation Data List.

| Category | Data Item |
|---|---|
| Well head | Location (x, y), Kelly bushing, total depth |
| Well path | Deviation survey |
| Well logs | Conventional log and interpretations (gamma, resistivity, porosity, Sw, density, neutron, caliper etc.), LWD Lithology (ELAN interpretations), Mineralogy (ECS) and Toc, Sw, Perm, porosity, AdsGas, freeGas etc. (Shale Gas Advisor) Lithofacies (Cluster - reservoir quality indicator) Rock mechanical property and stress (DSI/Sonic Scanner/MDT packer module) |

TABLE I-continued

Examples of Barnett Shale Gas Reservoir Modeling and Simulation Data List.

| Category | Data Item |
|---|---|
| Core data | Borehole image (FMI) and interpretations; fracture categories, corrections and analyses Lab test of petrophysical (k, phi, sw etc.), and geomechanical (UCI, elastic properties, including anisotropy) for possible log calibration |
| Isothermal | Shale rock adsorption/desorption test data; gas content (Langmuir pressure and volume constants); single and multi-component data |
| Well tops | Marker well name, depth, dip and azimuth if any |
| Structure | Surface, faults interpretation if any |
| Seismic | Original volume, and various derived attributes, and loading parameters |
| Velocity | Sonic log and check shots or velocity models or parameters |
| Fracturing Job | Stages, liquid and proppants volumes, schedules |
| Micro Seismic | Variety of attributes, pumping records, rate, pressure, ISIP data |
| Production | Production surveys, tracer test, well testing, and production dynamic data |
| Completion | Wellbore data, perforation, length |
| Fluid & Rock | Gas composition, water and oil, and other PVT properties; saturation functions |
| Reports | Any previous studies and reports |

In element 304, surface and fault interpretations may be performed in the time domain. Specifically, surface seismic interpretation can be accelerated with autotracking, and fault interpretation can be expedited through ant-tracking using simulation software. With the majority of the well data in the depth domain, seismic results may also be depth-converted and integrated. Often, check shots, sonic logs, and velocity data are available to build the velocity model. In one or more embodiments, interval velocities produced for each stratigraphic unit (zone) are satisfactory for modeling Barnett reservoirs.

In element 306, depth conversion may be performed to convert time domain seismic information such as original seismic data volumes or any other special seismic attributes, interpreted surfaces, and faults. Depth surfaces and/or well tops may be used to build model horizons.

At this stage, the horizons and well controls, together with proper fault modeling, segment definition, and boundary conditions are used to create a 3D structure model (element 308). The 3D model provides a framework for further geomechanical zone modification, log upscaling, seismic attributes resampling, data analysis, correlation development, fracture simulation driver development, discrete fracture modeling, and reservoir simulation gridding.

In element 310, a discrete fracture network (DFN) may be generated. Specifically, edge enhancement may be performed to identify faults, fractures, and other linear anomalies using seismic data. In this case, the seismic data may be conditioned by reducing noise in the signal, spatial discontinuities in the seismic data (edge detection) are then enhanced, and finally a seismic 3D volume including automated structural interpretations is generated, which significantly improves the fault attributes by suppressing noise and remnants of non-faulting events. Fault patches or planes of discontinuity can then be extracted from the 3D seismic volume. The patches of faults or fractures are analyzed and edited, and fracture/fault patches can be directly converted as a deterministic DFN.

In shale gas reservoir applications, the 3D seismic volume is used to identify significant fault and karst features. The karst features may be extracted and modeled as faults in conjunction with production, tracer testing, and well testing analysis to reveal the large-scale reservoir connectivity. A general observation in terms of Barnett reservoir connectivity is that wells several miles apart may have pressure communications. The pressure communications may be considered by manually adding fractures in the fracture model.

Although open natural fractures may not be identified from core samples, borehole images such as formation micro-images (FMI) may be used to interpret natural fractures (e.g., resistive, partial-resistive and conductive), which are subject to easier opening by hydraulic fracturing than virgin shale rock. In view of this, all types of interpreted fractures may be considered as constituting a "natural" fracture network that partially controls hydraulic fracture network intensity and distribution. Thus, one use of the "natural" network information is to assist the design of well path and hydraulic fracturing.

FMI interpreted fractures (and intensity logs) may also be classified, analyzed, and correlated with rock properties, geomechanical zones, and other seismic drivers. Further, various seismic attributes may be resampled into the 3D model. With flexible functionalities in the 3D model space, different fracture intensity drivers may be evaluated. The fracture intensity drivers include, but are not limited to, distance to faults, lithological properties, discontinuous properties, or neural network train-estimation derived properties (care should be taken to identify correlated drivers). With proper property drivers, fracture intensity 3D distributions may be achieved, mostly with stochastic simulations or possible deterministic methods. Those skilled in the art will appreciate that different types or sets of fracture intensity properties can be simulated separately with different drivers to reflect specific natural characteristics. With known well control fracture dips and azimuths input as constants, 2D or 3D properties, and specific fracture geometry specifications, 3D discrete fracture network (DFN) can be generated.

In element 314, microseismic mapping and post-hydraulic fracturing (PHF) network modeling may be performed. For example, based on the available field data, a proximal solution may be provided. As discussed above, MS monitoring has been used in the shale gas reservoir to monitor fracture propagation and the hydraulic job process, and to control fracture propagation through pressure/rate change and techniques such as fiber-assisted diversion. The significant features of aerially similar MS events distribution indicates that the shale gas reservoir PHF system is a fracture network, and therefore various operational techniques may be used to create additional aerial coverage and an intensified PHF network. Various horizontal and vertical FMI interpretations indicate a high intensity of "natural" fracture.

In one or more embodiments, an MS event envelope is used to estimate a 3D hydraulic fracturing stimulated reservoir volume (ESV) and then hydraulic fracturing job parameters are applied to estimate dynamic and propped fracture conductivity (possible permeability and width estimation). To estimate the PHF network, the MS event envelope may be extracted from the 3D model. In simple cases, a 2D mapview can be used to obtain the outside boundary. Vertically, the fractures growing into a non-reservoir formation may be considered for volume correction when calculating fluid and proppant conservations. With certain fracture propagation model assumptions, fluid and proppant mass conservation and fracture width distribution and fracture network intensity can be estimated and corresponding propped fracture width can be calculated. By applying laboratory results, fracture conductivity (FCD) may be estimated. "Natural" fracture DFN within an MS event envelope may be assumed to be opened and propped for evaluation in a base case reservoir simulation.

In element 316, fracture attributes and discrete fracture network (DFN) upscaling may be performed. For example, fracture attributes may be associated with a DFN. During DFN modeling as discussed above with respect to element 310, geometry parameters may be assigned to each fracture such as: surface area, dip angle, and dip azimuth. Other examples of attributes that may be assigned or calculated are aperture and permeability. The aperture data may be related to the calculations of porosity permeability. For both "natural" fracture networks and PHF networks with proper aperture and permeability, respectively, upscaling may be performed. The "natural" fracture network may serve as a background reservoir, and the PHF network, as modified with the MS and fracture job data, may serve as a stimulated reservoir volume with enhanced reservoir properties.

In one or more embodiments, the discrete fracture system may be upscaled to a dual porosity/permeability reservoir model and then use simulator(s) to model the reservoir dynamics. Examples of properties generated by the upscaling process include fracture porosity, fracture permeability, Sigma (shape) factor defining the connectivity between fractures and matrix, and fracture spacing along local directions (I, J, K) for each grid cell. Those skilled in the art will appreciate that the dual porosity modeling approach may not be suitable for all cases. A proper simulation should be based on a proper understanding of the DFN and PHF fracture systems and corresponding shale production mechanism.

Elements 310, 314 and 316 may be combined or replaced with an alternative methodology as shown in element 317. More specifically, element 317 generally describes the methodology discussed in detail below in reference to FIG. 4, where MS events and fracture job data as well as model data are used to calculate the induced fracture network, which may be seamlessly substituted for elements 310, 314, and 316 in the general workflow of FIG. 3.

In element 312, the structure from element 308 and the DFN from element 310 may be used to perform geomechanical modeling, where the results are used for generating a well path and HFT design with stress constraints and fault/karst avoidance. Specifically, the DFN including the FMI interpreted fractures may be used to generate the HFT design, where the natural tendency of the formation to fracture may be taken into account in order to optimize the hydraulic fracturing. In other words, based on the fracture orientations, network distribution and intensity of the natural fracture determined in element 310, proper well orientation and fracturing stage and perforation cluster designs may be generated to maximize fracture intensity and control PHF network distribution. Further, the results are also fed into element 320, as expressed below as the geomechanical modeling repeated in element 322.

Through core analysis and log interpretation, lithofacies and geomechanical and petrophysical properties may be obtained at well locations. Further, varieties of seismic attributes reflect lithofacies and mechanical and petrophysical formation characteristics. A geostatistical approach may be used to model the properties in a 3D distribution using well data as the primary data source and the seismic as secondary constraints. For example, lithofacies representations may correspond to a cluster result derived from a suite of basic logs (gamma, resistivity, density). The clusters (or lithofacies) data is used to classify mechanical and petrophysical properties. Within each cluster, constant values may be assigned, or conduct stochastic simulations may be performed.

The properties modeled using well logs and seismic include, but are not limited to, cluster facies, porosity, water saturation, permeability, total organic carbon (TOC), shale gas content and Young's modulus, Poisson's ratio, etc. In one or more embodiments, Sonic Scanner/DSI (dipole sonic image) derived parameters may be direction simulated and used to obtain final properties.

In element 318, the petrophysical properties such as effective porosity, water saturation, and gas content from the 3D geological structure model generated in element 308 may be used to estimate gas-in-place (GIP). In this case, the petrophysical properties may also be processed using an uncertainty workflow to rank the risks of various aspects of the wellbore.

In element 320, a reservoir simulation may be performed. More specifically a Barnett Shale reservoir simulation, production history matching, and sensitivity analysis may be performed.

The dual porosity reservoir properties (fracture permeability, etc.) upscaled from the DFN in element 316 and petrophysical matrix properties (e.g., phie, Sw, etc.) by stochastic simulation may be utilized by the reservoir simulator. With a known well completion configuration and production control, production history matching may be pursued to confirm or modify the reservoir model, especially the fracture network geometry, fracture connectivity, and permeability. Further, experimental design methodology may be used to perform sensitivity analysis, assist the history-matching process, and improve the reservoir characterization. In addition, a full automated history-matching process may be used to link geological model variation and the reservoir simulation in an iterative process.

With the validated reservoir model, a production forecast may be performed and estimated ultimately recoverable (EUR) may be estimated. If permeability change versus reservoir pressure is known, the impact of permeability decrease with production may be considered.

In element 322, geomechanical modeling and stress analysis may be performed. Specifically, FMI interpreted drilling-induced fractures and possible wellbore breakouts may be used to determine stress direction and distribution. Sonic Scanner and DSI (dipole sonic image) data may also be used to estimate mechanical properties of rock formations and stresses. Wire line formation tester (e.g., modular formation dynamics tester or some other tester) tests and interpretation may be used to calibrate in-situ stress data (pore pressure and minimum stress). Further, some seismic attributes may be extracted to guide a 3D stress field distribution. Using reservoir simulation software, a mechanical earth model (MEM) with rock mechanical properties, faults, fractures, overburden, underburden, side burden, complex geological structures, and pore pressure and stress/strain boundary conditions may be generated and used for pore pressure prediction, geomechanical modeling, and wellbore stability analysis. Geomechanical modeling packages (such as a stress analysis simulator) could simulate in-situ stress distribution, stress-sensitive permeability and porosity changes, and study hydraulic fracture propagation mechanism. Coupling geomechanical modeling (stress analysis simulation) with reservoir simulation may optimize reservoir development strategies, wellbore stability analysis, optimum mud weight design, formation subsidence, and casing damage analyses with reservoir depletion.

In element 324, well spacing, hydraulic fracturing design, and/or production optimization may be performed. In the case of production optimization, control parameters of the hydraulic fracturing process may be modified based on the reservoir simulation of element 322 (i.e., where to create the fracture network, how intensified the network needs to be, and how to implement through operations). Further, based on reservoir characterization as proposed above, the following steps may be performed: 1) using the geological modeling result, particularly the DFN network information, geomechanical heterogeneity and stress field, to conduct a geomechanical modeling study to provide qualitative guidance for a well path, well completion, fracture stages and cluster designs; 2) establishing a relationship among reservoir characteristics, job processes, various scenarios (e.g., well lengths, fracture stages, liquid and proppant volumes, etc.), and reservoir production behavior; 3) performing reservoir simulation sensitivity analysis (ensuring that the proper application of the dual porosity model is applied in simulation); 4) extracting guidelines for future design practices and operations.

Those skilled in the art will appreciate that portions of FIG. 3 may be applied in various field development stages. For example, elements of FIG. 3 may be performed to construct structural models and 3D visualizations of a structural surface superimposed with seismic attributes to monitor live fracturing jobs and respond with operation modifications such as fiber diversion (e.g., a stage of slurry containing degradable fibers is used to create a temporary bridge within the fracture, and make a pressure increase and force fracture propagation into another zone or a different area of the same formation). In another example, elements of FIG. 3 may be performed to distribute 3D clusters in reservoirs (clusters denoting reservoir quality such as "brown/orange" as "high TOC, high silica, and highest perm," etc.). Further, geostatistical property modeling may be used to upscale facies log and simulate with seismic attributes and neural network trained-estimation properties. In this case, the significant features of facies continuity may be confirmed with an additional cluster log, where the simulated 3D result is used to guide well path design, targeting the best quality of the reservoir.

In yet another example, elements of FIG. 3 may be performed to distribute the DFN in a 3D reservoir and analyze the relationship between MS events response and "natural" fracture orientations. In this example, the total set of fractures may be divided into four subsets: N_S:N, N_S:S, E_W:E, and E_W:W. Drilling-induced fractures may be aligned with one subset (set E-W) of natural fractures (thus the minimum stress direction is perpendicular to fracture strike in the E-W set). Following the workflow, the DFN network may be simulated, and MS events may be displayed over the DFN network. The MS events may be controlled by the minimum stress direction and the existing "natural" fractures. Specifically, MS events may align with the subsets of E_W:W and E_W:E, where the N_S sets help create the wide band nature of the MS events.

Figure 4:
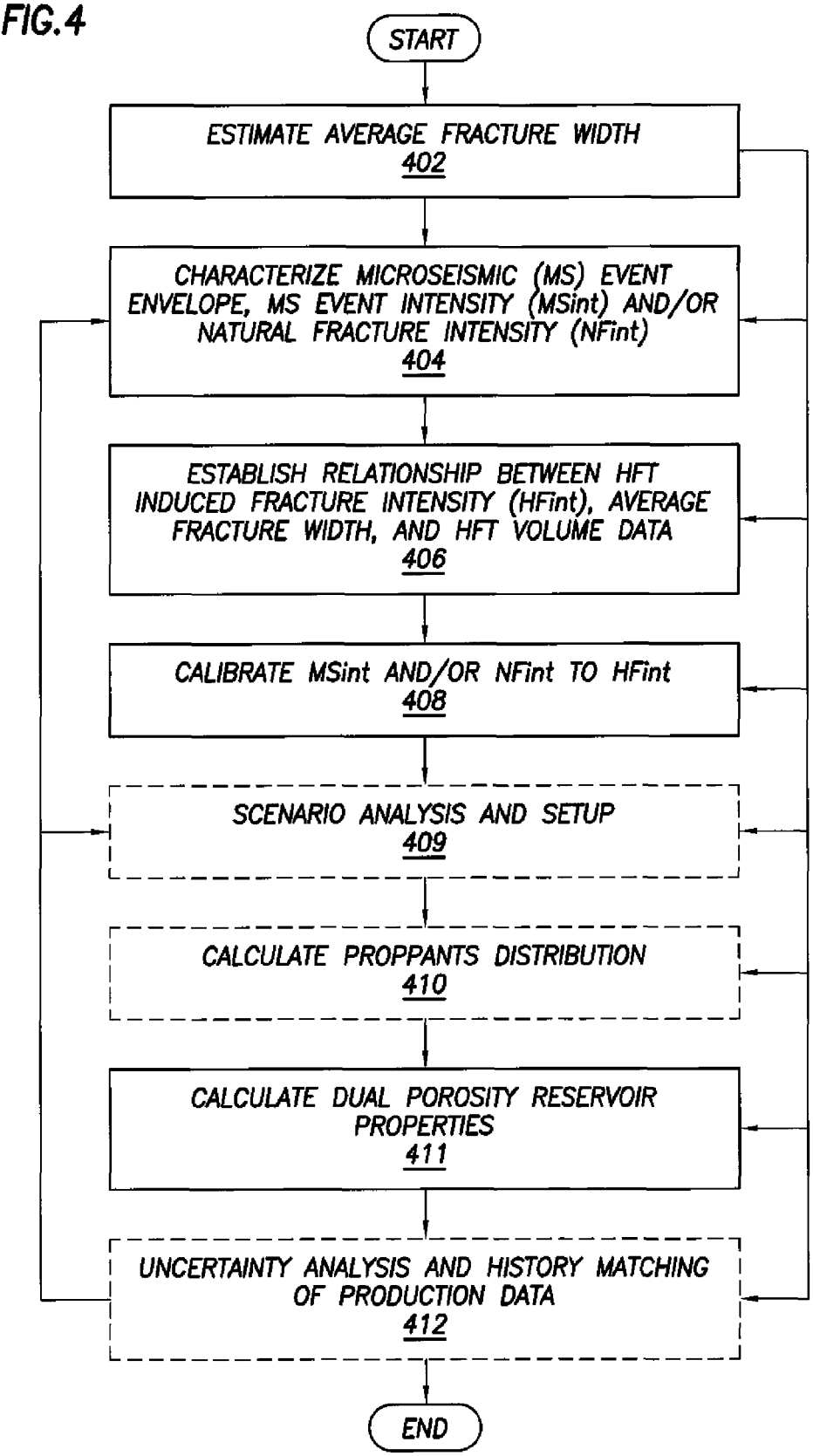

FIG. 4 shows a flow chart depicting an alternative method for performing fracture modeling. More specifically, the alternative method may be substituted for elements of 310 and 320 in FIG. 3. In other embodiments, a DFN network generated from FIG. 3 may be used in FIG. 4 and as an alternative method to generate a simulation model. Accordingly, the scope of modeling hydraulic fracturing induced fracture networks as a dual porosity system should not be considered limited to the specific arrangement of steps shown in FIG. 4, and the information generated in FIG. 3 (other than elements 314 and 316) may be fully incorporated into the workflow discussed below with respect to FIG. 4.

Those skilled in the art will appreciate that the general workflow described with respect to FIG. 3 may be modified to account for borehole image interpreted natural fractures (e.g., mineral-filled, partial and open), which have been found to control the distribution of HFT induced fractures. In this case, a corresponding discrete fracture network (DFN) may be generated based on borehole image interpretations and seismic attributes and used to further calibrate the HFT network systems. The impact of the fracture network and potential main fractures on production may be quantified through sensitivity studies of horizontal wells with hydraulic fractures in shale gas reservoirs. Such studies indicate that the matrix-fracture sigma factor, stimulated fracture network permeability, and HFT induced main fractures spacing and conductivity highly influence production.

In one or more embodiments, the description and calibration of a post-HFT fracture network is used in production prediction. By decoupling the complex description of shale reservoir geological, geophysical and petrophysical characteristics, and geomechanical factors from production responses, induced fracture network may be estimated from HFT using MS events and/or "natural fracture" intensity, and fracture job data. In this case, MS responses are used to delineate HFT stimulated volumes. Further, MS events and/or natural fracture intensity provide an initial estimation of HFT fracture intensity which will be further calibrated with HFT job data. Major physical constraints in fracture fluid mass conservation, interpreted HFT main fractures and spatial heterogeneity of HFT fracture network intensity are also incorporated. An equivalent dual porosity reservoir model may be generated for production history-matching and uncertainty analysis.

Returning to FIG. 4, in element 402, an average fracture width may be estimated. Conjugated natural fracture sets, whether open or fully or partially mineral-filled, exist ubiquitously in shale reservoirs. Often the natural fractures are clusters of calcite-filled fractures with inches to hundreds of feet of spacing as interpreted from horizontal well borehole image logs. The natural fractures serve as weak planes and lead to fracture propagation, which largely contributes to the MS cloud observation. In addition, the low contrast between maximum and minimum stress also plays important roles for HFT fracture network behavior especially in a Barnett reservoir.

Figure 5:
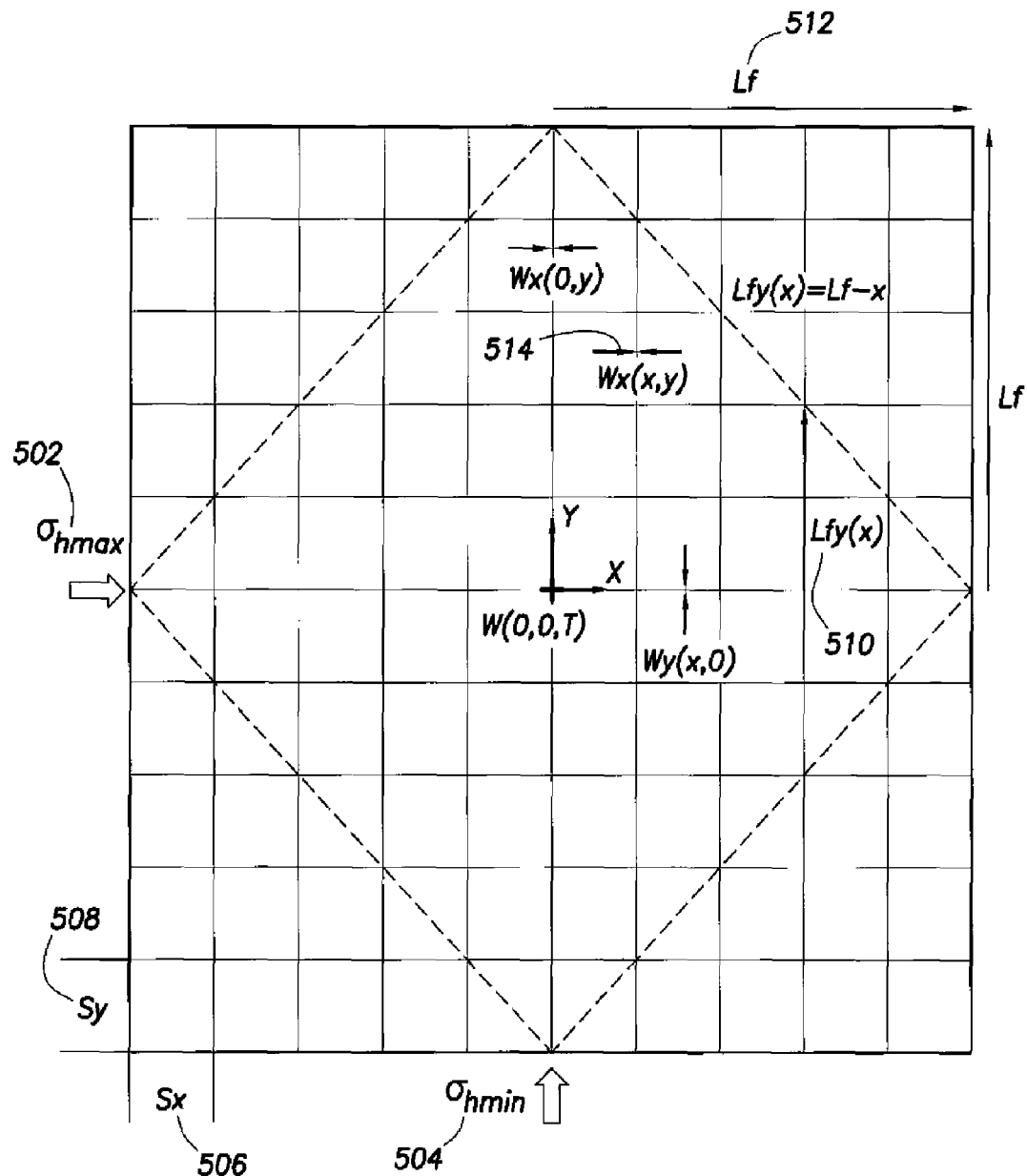
FIG. 5 depicts an example grid portion of an in-situ fracture network.

FIG. 5 shows an ideal case of an in-situ fracture network for estimating the average fracture width. In FIG. 5, $\sigma_{hmin}$ (504) and $\sigma_{hmax}$ (502) are horizontal stress; Sx (506) and Sy (508) are the fracture spacing along the x and y direction respectively; Lf (512) is the maximum HFT-opened fracture length; and Wx/Wy (514) are various fracture widths at different locations and along different directions. Further, Lfy(x) (510) indicates the distance of a boundary line away from x-axis. For simplicity, it can be assumed that all fractures are calcite-filled or all open, and evenly spaced, and the horizontal stresses (502, 504) are the same ($\sigma_{hmin}=\sigma_{hmax}$) with vertical stress $\sigma_v$ greater than $\sigma_{jmax}$ (502).

At time zero, HFT slurry is pumped at the origin (0,0) with pressure (p–$\sigma_{min}$ (504)). With smaller tensile (~half or 0) strength than the matrix, the "natural" fractures will be forced to open and the slurry moves along the fractures. At the end of pumping process (time T), the slurry front reaches the boundary shown as the dashed line in FIG. 5.

Based on hydraulic fracturing theory and the Perkins-Kern-Nordgren (PKN) model, given bottom hole HFT pressure (after perforation) p, minimum horizontal stress $\sigma_{hmin}$ (504), fracture height Hf, Poisson's ratio $\upsilon$ and shear modulus G, the fracture width at the location of injection points can be expressed as:

$$W(0,0,T)=(1-\upsilon)H_f(p-\sigma_{hmin})/G \quad (1)$$

The fracture width distribution along the x-axis (y=0) is $$Wy(x,0)=W(0,0,T)(1-x/Lf) \quad (2)$$

The fracture width along the y direction at any (x,y) location is $$Wx(x,y)=Wy(x,0)(1-y/Lfy(x))^{1/4} \quad (3)$$

Where Lf is the longest fracture opened as indicated in FIG. 5.

Taking the area of first quadrant and integrating for average, one can obtain the averaged fracture width in the region as $$Wavg=32/45 \ W(0,0,T) \quad (4)$$

Equations (1) and (4) offer a first order estimation of averaged fracture width and its relationship with shale gas geomechanical properties and HFT pressure. As we know that there are uncertainties in estimation of $\upsilon$, Hf, p, $\sigma_{hmin}$ and G, the heterogeneity of lithology, mineral filled fracture intensity as well as stress field, the fracture width is valid in a statistical sense and it can be adjusted or calibrated through uncertainty analysis.

For example, three stages of HFT and MS event data mapping may be performed. One typical stage fracturing slurry and proppant data are shown in Table 2. Geomechanical data used for the base case calculation are Poisson's ratio $\upsilon$; shear modulus G, and an estimated net fracturing pressure (DP), which is equal to p–$\sigma_{hmin}$ as shown, for example, in Table 3.

TABLE 2

Typical one stage pumping data

| Proppant Type | Net Sand Volume, m3 | Slurry Volume, m3 |
|---|---|---|
| 100- | 5 | 550 |
| 40/70 | 45 | 1450 |
| 20/40 | 20 | 500 |
| Total | 70 | 2500 |

TABLE 3

Geomechanical data

| Item | Value | unit |
|---|---|---|
| $\upsilon$ | 0.2 | |
| G | 12500000 | KPa |
| DP | 900 | KPa |
| Hf | 91 | m |

In this example, the base geomechanical values in Table 3 may be applied to equations (1) and (4) to estimate Wavg as 0.0037 m. The fracture width is related to the total slurry volume pumped in a HFT and may be used for fracture intensity calibration as discussed below.

Returning to FIG. 4, in element 404, a microseismic event envelope and base intensity data may be characterized using a three-dimensional geomodel. For example, the base intensity data may include microseismic event intensity (MSint) and/or natural fracture intensity (NFint). Although MS events have rich information (e.g., signal noise ratio, amplitude, cloud volume, and a fracture interpretation, etc.), with complex geomechanical phenomena, there is no theory available on how to directly derive useful fracture network information. MS event density data may be used as a scalable indicator to estimate initial fracture network intensity (MSint). In this case, the MSInt data may be determined based on microseismic event counts per unit volume of the microseismic event data. More specifically, a cut-off area/volume may be used to quantify an area or a volume of fracture presence (i.e., Estimated Stimulation Volume (ESV)) and thus differentiate the MS events boundary from the fracturing slurry boundary. For example, the total slurry fluid volume of a HFT job and fracture width constraints can be applied to calibrate the real fracture intensity (HFint). In another example, fracture intensity may be obtained from borehole images as an initial distribution (NFint), and then trimmed with MSint greater than the cut-off volume (to set the outside ESV NFint to zero). The total fracture slurry fluid volume and fracture width are used to calculate the intensity (HFint). To obtain the MSint distribution, the original MS event data may be resampled into a 3D geomodel and further upscaled with a proper larger averaging window size to obtain continuous intensity properties. Note that a 3D geomodeling approach is used here because of the complex and heterogenic nature of the MS event and natural fracture distributions. One skilled in the art will appreciate that a 2D zonal average may introduce unperceivable inaccuracies and uncertainties. If a capable HFT design tool is available in the future, the designed fracture network and intensity may be directly utilized by the workflow of FIG. 4 for dual porosity modeling and uncertainty analysis.

In element 406, a relationship is established between HFT induced fracture intensity (HFint) (i.e., fracture intensity of a post-HFT network), average fracture width, and HFT volume data (i.e., HFT slurry volumes). Based on the mass conservation principle, the entire treatment slurry volume is contained in all fractures (with an acceptable assumption that there is no leak-off into the matrix). Thus, the HFT induced fracture network has to be capable of containing the slurry volume:

$$V\text{slurry} = \Sigma \text{HFint}(i,j,k) * V\text{bulk}(i,j,k) * W\text{avg} \qquad (5)$$

Where Vslurry is the total slurry volume of fracturing fluid; Vbulk(i,j,k) is a 3D geomodel grid cell bulk volume and (i,j,k) covers all geomodel cells. The equation above may be used to determine HFint based on average fracture width and HFT volume data.

Those skilled in the art will appreciate that some main hydraulic fractures may be interpreted from MS events, where the volumes of the MS events may be considered (subtracted) when calculating the HFint values.

In element 408, the base intensity data may be calibrated to HFint. For example, assuming that both MSint and NFint reflect the HFint in a linear fashion (or other describable relationship), one can calibrate MSint or NFint to HFint using the following:

$$\text{HFint}(i,j,k) = A * \text{MSint}(i,j,k) \text{ or } B * \text{NFint}(i,j,k) \qquad (6)$$

Where A and/or B in equation (6) are adjustable factors to account for the correction from MSint or NFint to HFT-induced fracture network intensity. Using equations (5) and (6), A and/or B may be calculated to obtain 3D property distribution of HFint(i,j,k) based on MSint or NFint.

In the example above in element 402, equations (5) and (6) may be used to obtain the calibration factor A=62, which allows for the generation of an HFint 3D distributions used to calculate HFint. In this case, the average and standard deviation of HFint is 0.084 # fractures/ft and 0.149 # fractures/ft, respectively.

Optionally, in element 409, a scenario analysis and setup may be performed. More specifically, different attributes and/or MS event information (e.g., different MSint properties) may be estimated for simulation. Similarly, using different interpretations of borehole image data or scenarios of analysis, and different property modeling realization or changes, NFint values may be modified. In this case, different HFint values may be obtained with additional rounds of calibration.

For example it may be assumed that the proppants will follow the sequence of the pumping schedule, the coarser proppants will remain near wellbore, the finer mesh proppants and pad fluid will move farther near the ESV boulder regions, and the intermediate proppants remain in between. In another example, main HFT fractures may be interpreted from each stage, and then distances may be calculated from the main fractures to place fine, intermediate, and coarse proppants. In yet another example, it may be assumed that proppants build banks at a lower half plane along wellbore, so the network fracture permeability may be intentionally modified accordingly. In each of the examples, individual fracture permeability may be changed and network permeability may be recalculated and then used to perform reservoir simulations.

For example, consider 100, 40/70 and 20/40 mesh proppants and pad slurry being sequentially and successively injected into the shale reservoir. To estimate the impact of different sizes of proppants, it can be assumed that the three different slurries are pushed into the formation as rings of "piston slug" away from the wellbore. In view of volume conservation, each proppant type control volume may be estimated in 3D space, allowing the fracture permeability to be modified. For example, with a known slurry volume 500 $m^3$ of 20/40 proppants, the outer-boundary away from wellbore of 110 ft may be found by iteratively solving the equation of $\Sigma$HFint(i,j,k)*Vbulk(i,j,k)*Wavg=500; similarly the outer boundary of 40/70 proppants can be calculated as 400 ft. The aforementioned calculations may be easily achieved with workflow functions of a variety of geomodeling packages.

In another example, main fractures may be interpreted from MS events, where MS events are simulated in time steps to determine whether any main fractures are initiated and propagated during the HFT. The interpreted main fractures can be utilized in discrete fracture modeling and converted into a DFN model, where each fracture may be assigned with a different permeability and aperture size and then upscaled with other types of network fractures. Similar to the distance from the wellbore, "distance from the main fractures" may be used to define various control ranges and to modify regional fracture permeability.

Optionally, in element 410, proppant distribution may be determined for the scenario obtained in element 409. In this case, the proppant distribution may be determined based on HFT fracture intensity, permeability, and/or fracture conductivity. Field operations for the reservoir may be performed based on the proppant distribution and/or a dual porosity reservoir model as discussed below.

In element 411, a dual porosity reservoir model may be generated. Using the fracture intensity distribution and known fracture geometry, a discrete fracture network (DFN) may be generated, where additional processing is performed to obtain real fracture distribution parameters. In this case, the majority of the HFT induced network of fractures is hydraulically created and connected, which may be distinguished from conventional natural fracture systems. Nevertheless, a DFN modeling approach may be relevant and offers a useful tool to investigate various modeling assumptions for uncertainty studies.

With a known fracture intensity property, averaged width and fracture permeability Kf, a fracture network porosity $\Phi f$, permeability Kfx/Kfy, and sigma factors S may be calculated. Assuming that the fracture intensity is the same along the x and y directions as shown in FIG. 5, $$\text{HFintx} = \text{HFinty} = \frac{1}{2} \text{HFint} \qquad (7)$$

Which indicates that the directional network permeability's (Kfx and Kfy) are the same. Using Darcy's law, the flow of individual fractures can be calculated using an equivalent permeability for the fracture network as follows:

$$Kfx = HFintx * Kf * Wavg \quad (8)$$

Correspondingly, fracture network porosity may be calculated as:

$$\phi_f = HFint * Wavg \quad (9)$$

And the connection factor, sigma factor S, between the matrix and fracture, may be calculated as:

$$S = 4(1/Sx^2 + 1/Sy^2) = 4(HFintx^2 + HFinty^2) = 2HFint^2 \quad (10)$$

At this stage, all parameters required for dual porosity modeling are obtained, and a reservoir simulation may be performed using the parameters calculated above. Specifically, with various volume controls, each region of the reservoir simulation may have an independent set of variables with a different range of uncertainties. Examples of variables include, but are not limited to, MSint upscaling dependent on grids, cut-offs, boundary expansions; different proppant propping mechanisms related to permeability estimations (e.g., banking, partial or embedding and others); fracture porosity assumptions and water holdings; sigma factor considerations; and geomechanical and stress parameters. The range of permeability as well as other parameters may be modified in the reservoir simulation(s), and equations (8)-(10) may be used to calculate all dual porosity reservoir parameters. Once the major factors are determined, history matching of production may be performed by fine-tuning the fracture network properties and formation parameters. The post-history matched reservoir model may then be used for production prediction.

Optionally, in element 412, uncertainty analysis and history matching of production data may be performed. Due to the complex characteristic of shale gas reservoirs, horizontal wells, hydraulic fracturing treatment, and various schemes all have an impact on the total response of production. Numerous uncertainty factors involved in many aspects of earth sciences and engineering also have an impact on the total response of production. A number of the uncertainty factors are discussed below.

MS event envelope and fracture fluid travel depth—it is generally acknowledged that the MS event envelope indicates a larger volume than the actual fracture fluid invasion; and both envelope and invasions are larger than proppants propped volume. Further, an MS event also has velocity related uncertainty. Although an MS event envelope may be considered separately from a fracture fluid front envelope, and the event may indicate a larger permeability enhancement volume than the envelope, in this case only one MS event intensity cut-off is used to indicate and set a HFT network boundary (i.e., fracture fluid boundary), which is solely responsible for any network fracture permeability enhancement. In other words, MSint will be applied with a different cut-off to obtain the HFT fracture network volume or the ESV. One skilled on the art will appreciate that in cases with leaking faults or other factors, MS events may be totally obscured and not used.

Different initial fracture intensity estimation—using different attributes or uses of MS event information, different MSint properties may be estimated. Similarly, using different interpretations of borehole image data or scenarios of analysis, and different property modeling realization or changes, NFint values may be modified. In this case, different HFint values may be obtained with additional rounds of calibration.

HFT bottomhole pressure and geomechanical properties—in the estimation of averaged fracture width of element 402, the calculation of treatment pressure behind entry points, the estimation of in situ minimum stress, the use of fracture height, and other geomechanical parameters related to litho-heterogeneity, each have uncertainties to some extent. By assigning reasonable ranges of variations, the effects of the uncertainties from the aforementioned parameters on the obtained fracture network system may be quantified.

Proppant distribution and fracture conductivity—one skilled in the art will appreciate that larger proppants in later scheduled pumps may build banks of proppants in areas near the wellbore area or may only be transported into main fractures. In this case, the high concentration proppants volume may be very limited for shale gas production (i.e., limited fracture surfaces). Alternatively, if one assumes no separation of proppants with its host slurry and deep travel into the network, the average proppant thickness will have less than a single layer of proppant, which leads to unfavorable fracture conductivity values. The HFT fracture network should have different mechanisms to maintain openings, such as through water holding, rock deformation, and shear movement of fracture walls to create uneven contacts and maintain flow paths. Time dependent permeability changes may also be considered.

Dual porosity model and shale gas reservoir simulation—various analytical and numerical studies confirm that the dual porosity reservoir model is a valid shale gas reservoir simulation method. In one or more embodiments, the in-situ natural fracture system has complex sets and various intensities. Compounding the minimum and maximum horizontal stress contrast, the HFT induced fracture network may be directionally dominated. In this case, the current scheme of average treatment, sigma factor, and directional permeabilities may be also considered using uncertainty analysis.

All relevant uncertainty in associated parameters may be set with an uncertainty workflow and further quantified through multiple simulation runs. The results may be analyzed to identify the most significant factors. History-matching may be performed to calibrate the HFT fracture network with production predictions. Examples of uncertainty parameters are shown below in Table 4.

TABLE 4

Example uncertainty parameters.

| Uncertainty Parameter | Example Values |
|---|---|
| W0 = (1 − v)Hf * DP/G | For a particular fracture width (W0): Poisson's ratio (v) may be 0.15, 0.2, 0.25, 0.3, 0.35, etc.; stress difference (DP) may be 500, 700, 900, 1100, 1300, etc.; fracture height (Hf) may be 50, 70, 91.46341, 110, 130, etc.; and shear modulus (G) may be 1.00E+07, 1.10E+07, 1.25E+07, 1.40E+07, 1.50E+07, etc. |
| A = Vslurry/sum(Wavg * MSint * Vbulk) | MSInt (or energy, amplitude, etc.) may be determined using moving window sizes or MS detected incorporating a S/N adjustment etc. Alternatively, NFint may be used as discussed above |
| HFintx = coef * Hfint<br>HFintY = (1 − coef) * HFint | Coefficients for separating the fracture intensity into directional fracture intensities may be 0.5, . . ., 0.2, 0.3, 0.4, 0.6, 0.7, etc. |

TABLE 4-continued

Example uncertainty parameters.

| Uncertainty Parameter | Example Values |
|---|---|
| WavgP<br>Or<br>C * Wavg | Spatial change may be used for WavgP or a water holding co-efficient (C) may be used to convert dynamic width Wavg to post-fracture width. C may be 1, 0.8, 0.6, 0.4, etc. |
| Kf = HFint/2 * WavgP * Kfrac<br>Or<br>Kfx_dual = HFintx * WavgP * Kfrac<br>Kfy_dual = HFinty * WavgP * Kfrac | Fracture permeability (Kf) may use the uncertainty parameter Kfrac for individual fracture permeability, which depends on proppant transport, propping and fracture wall contact mechanism, water holding, etc. Further, WavgP * Kfrac may be used as fracture conductivity FC(0.1-200 mdft). Kfrac may be 1, 10, 100, 1000, 10000, etc. |
| S = 2HFint * HFint<br>Or<br>S = 4(HFintx * HFintx + HFinty * HFinty) | Sigma (S) may represent the irregularity of fracture contacts. |

FIGS. 6.1-6.9 show the impact of Poisson's ratio (υ), fracture height (Hf), stress difference (DP), shear modulus (G), fracture network conductivity (FC), water holding coefficient (C), and micro-seismic intensity (MSint) on cumulative gas production. Specifically, FIGS. 6.1-6.9 show a sensitivity study, where selected parameters include rock mechanical and stress data, water holdings in fracture network, fracture network conductivity, and micro-seismic intensity. In this case, linear experiments of Plackett-Burman type have been designed to investigate impacts of primary dependent parameters on gas production from the shale gas reservoir.

FIG. 6.1 shows the impact of Poisson's ratio (υ), FIG. 6.2 shows the impact of fracture height (Hf), FIG. 6.3 shows the impact of stress difference (DP), FIG. 6.4 shows the impact of shear modulus (G), FIG. 6.5 shows the impact of fracture network conductivity (FC), FIG. 6.6 shows the impact of water holding coefficient (C), and FIG. 6.7 shows the impact of micro-seismic intensity (MSint) on cumulative gas production. FIG. 6.8 shows the sensitivity parameters used during the sensitivity study. As shown in FIG. 6.9, the most influential parameter is fracture network conductivity. In this example, a constant fracture conductivity is used for the entire fracture network in each simulation. Since conductivity near the wellbore has the largest impact on gas production, the large difference in the gas production shown in FIG. 6.5 may be attributed to the near wellbore conductivity effect, which is further illustrated by the reservoir pressure distribution shown and discussed below with respect to FIG. 7. Further, FIG. 6.9 shows that the fracture height, micro-seismic intensity, and stress difference are also important although to a lesser extent than the fracture network conductivity. Also, in this example, the fracture height and stress difference appear to have negative impacts on the gas production.

FIGS. 7.1-7.3 show the impact of the stimulated fracture network conductivity on drainage volume at the end of 10 years. In this example, the pressure drawdown during production is more than 30 psi from the initial reservoir pressure of 3,000 psi. In FIG. 7.1 where the Fe is 0.1 md-ft, the reservoir pressure is high around the wellbore, and the majority of the drawdown occurs at a short distance from the wellbore, which clearly shows the bottleneck effect of the low near wellbore conductivity. An enhancement in the stimulated fracture network conductivity may result in a larger drainage volume around the well as shown by FIGS. 7.2 and 7.3.

Figure 8:
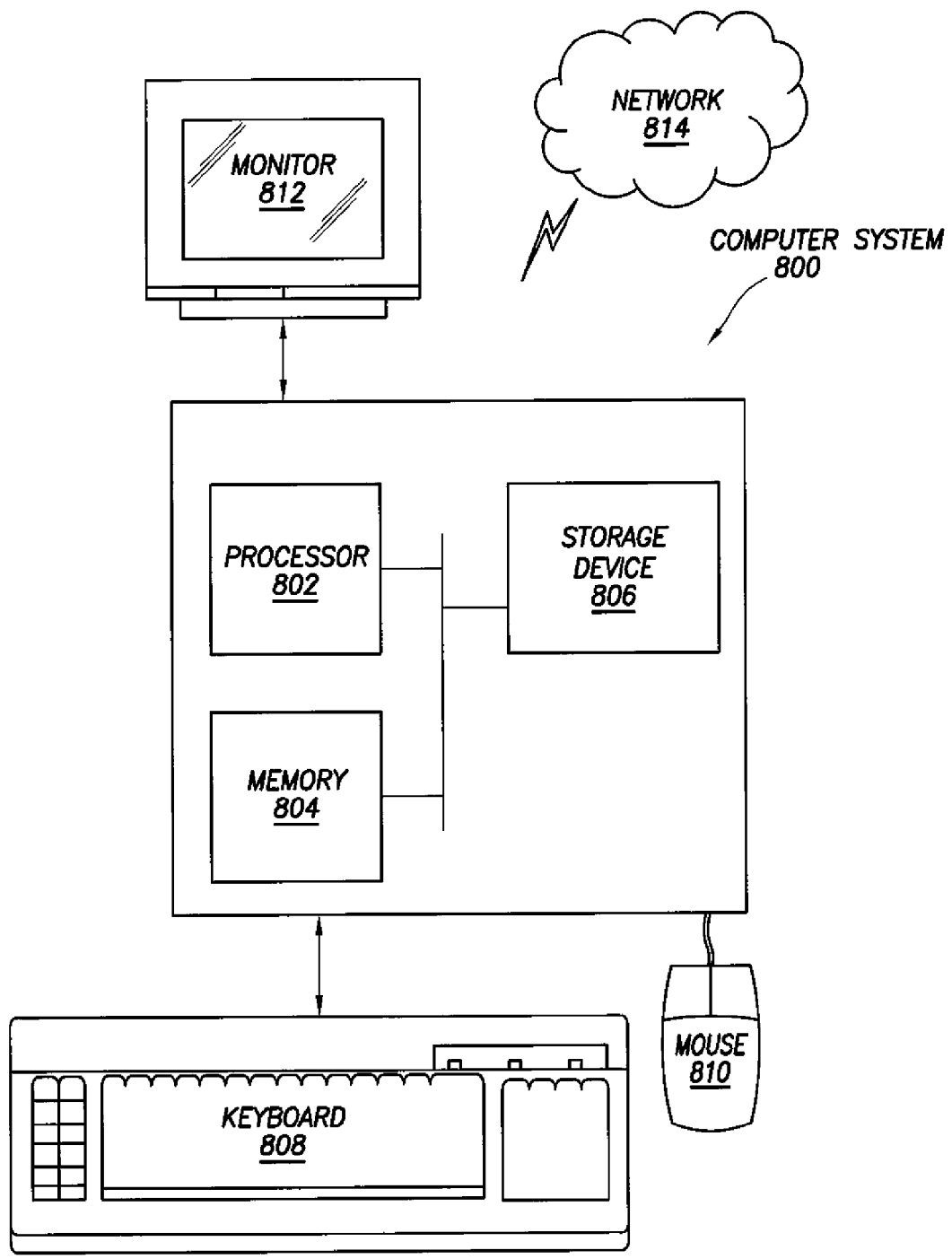
FIG. 8 depicts an illustrative computer system on which implementations of various techniques described herein may be implemented in accordance with one or more embodiments.

Embodiments of modeling hydraulic fracturing induced fracture networks as a dual porosity system (or portions thereof), may be implemented on virtually any type of computer regardless of the platform being used. For example, as shown in FIG. 8, a computer system (800) includes one or more processor(s) (802), such as an integrated circuit, a central processing unit (CPU), or other hardware processor, associated memory (804) (e.g., random access memory (RAM), cache memory, flash memory, etc.), a storage device (806) (e.g., a hard disk, an optical drive such as a compact disk drive or digital video disk (DVD) drive, a flash memory stick, etc.), and numerous other elements and functionalities typical of today's computers (not shown). The computer system (800) may also include input means, such as a keyboard (808), a mouse (810), or a microphone (not shown). Further, the computer system 600 may include output means, such as a monitor (812) (e.g., a liquid crystal display (LCD), a virtual projection or image, a plasma display, or cathode ray tube (CRT) monitor). The computer system (800) may be connected to a network (814) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (800) includes at least the minimal processing, input, and/or output means necessary to practice one or more particular embodiments of modeling hydraulic fracturing induced fracture networks as a dual porosity system (or portions thereof).

Further, those skilled in the art will appreciate that one or more elements of the aforementioned computer system (800) may be located at a remote location and connected to the other elements over a network. Further, one or more embodiments may be implemented on a distributed system having a plurality of nodes, where each portion may be located on a different node within the distributed system. In one or more embodiments, the node corresponds to a computer system. Alternatively, the node may correspond to a processor with associated physical memory. The node may alternatively correspond to a processor with shared memory and/or resources. Further, software instructions for performing one or more embodiments of modeling hydraulic fracturing induced fracture networks as a dual porosity system may be stored on a non-transitory computer readable storage medium such as a compact disc (CD), a diskette, a tape, or any other computer readable storage device.

It will be understood from the foregoing description that various modifications and changes may be made in the preferred and alternative embodiments the invention without departing from its true spirit. For example, the method may be performed in a different sequence, and the components provided may be integrated or separate. The method may be applied to any modeling hydraulic fracturing induced fracture networks as a dual porosity system is required or desired.

This description is intended for purposes of illustration only and should not be construed in a limiting sense. The scope of the invention should be determined only by the language of the claims that follow. The term "comprising" within the claims is intended to mean "including at least" such that the recited listing of elements in a claim are an open group. "A," "an" and other singular terms are intended to include the plural forms thereof unless specifically excluded.

While modeling hydraulic fracturing induced fracture networks as a dual porosity system has been described with respect to a limited number of embodiments, those skilled in the art, having benefit of this disclosure, will appreciate that other embodiments can be devised which do not depart from the scope of modeling hydraulic fracturing induced fracture networks as a dual porosity system as disclosed herein. Accordingly, the scope of the invention should be limited only by the attached claims.

What is claimed is:

1. A method for creating a dual porosity reservoir model, comprising:
   estimating an average fracture width of a fracture network using one or more of net fracturing pressure, Poisson's ratio, shear modulus, and fracture height;
   determining microseismic event envelope and base intensity data using a three-dimensional geomodel comprising microseismic event data;
   determining hydraulic fracturing treatment (HFT) fracture intensity of post-hydraulic fracturing treatment (post-HFT) based on the average fracture width and HFT volume data;
   calibrating, by a computer processor, the base intensity data to the HFT fracture intensity to obtain calibrated HFT fracture intensity;
   determining a proppant transportation and distribution scenario; and
   generating the dual porosity reservoir model based on the calibrated HFT fracture intensity and the proppant transportation and distribution scenario.

2. The method of claim 1, further comprising, where the proppant transportation and distribution scenario is determined based on at least one of a group consisting of the HFT fracture intensity, permeability, and fracture conductivity, wherein field operations are performed based on the proppant transportation and distribution scenario.

3. The method of claim 2, wherein the permeability is calculated using the following equation:

$$Kfx = HFintx * Kf * Wavg,$$

wherein HFintx is x-directional HFT fracture intensity, Kf is fracture permeability, Wavg is the average fracture width, and Kfx is x-directional network permeability.

4. The method of claim 1, wherein the base intensity data comprises microseismic event intensity and natural fracture intensity.

5. The method of claim 4, wherein the microseismic event intensity is determined based on microseismic event counts per unit volume of the microseismic event data.

6. The method of claim 1, wherein the base intensity data comprises at least one selected from a group consisting of signal noise ratio, amplitude, cloud volume, and a fracture interpretation.

7. The method of claim 1, wherein the HFT fracture intensity is determined based on the average fracture width and HFT volume data using the following equation:

$$Vslurry = \Sigma HFint(i,j,k) * Vbulk(i,j,k) * Wavg,$$

wherein Vslurry is a total slurry volume of fracturing fluid, Vbulk is a 3D geomodel grid cell bulk volume of the dual porosity reservoir model, HFint is the HFT fracture intensity, Wavg is the average fracture width, and i, j, and k are local directions for each grid cell of the dual porosity reservoir model.

8. The method of claim 1, wherein the base intensity data is calibrated to the HFT fracture intensity using the following equation:

$$HFint(i,j,k) = A * MSint(i,j,k),$$

wherein HFint is the HFT fracture intensity, MSint is microseismic event intensity, A is a configurable correlation factor, and i, j, and k are local directions for each grid cell of the dual porosity reservoir model.

9. A system for creating a dual porosity reservoir model, comprising:
   a fracture network characterization tool configured to:
      estimate an average fracture width of a fracture network using one or more of net fracturing pressure, Poisson's ratio, shear modulus and fracture height;
      determine microseismic event envelope and base intensity data using a three-dimensional geomodel comprising microseismic event data;
      determine hydraulic fracturing treatment (HFT) fracture intensity of post-hydraulic fracturing treatment (post-HFT) based on the average fracture width and HFT olume data;
      calibrate the base intensity data to the HFT fracture intensity to obtain calibrated HFT fracture intensity;
      determine a proppant transportation and distribution scenario; and
      generate the dual porosity reservoir model based on the calibrated HFT fracture intensity and the proppant transportation and distribution scenario; and
   a surface unit comprising a processor and configured to:
      perform field operations based on the dual porosity reservoir model.

10. The system of claim 9, wherein the proppant transportation and distribution scenario is determined based on at least one of a group consisting of the HFT fracture intensity, permeability, and fracture conductivity.

11. The system of claim 10, wherein the fracture network characterization tool calculates the permeability using the following equation:

$$Kfx = HFintx * Kf * Wavg,$$

wherein HFintx is x-directional HFT fracture intensity, Kf is fracture permeability, Wavg is the average fracture width, and Kfx is x-directional network permeability.

12. The system of claim 9, wherein the fracture network characterization tool determines the HFT fracture intensity based on the average fracture width and HFT volume data using the following equation:

$$Vslurry = \Sigma HFint(i,j,k) * Vbulk(i,j,k) * Wavg,$$

wherein Vslurry is a total slurry volume of fracturing fluid, Vbulk is a 3D geomodel grid cell bulk volume of the dual porosity reservoir model, HFint is the HFT fracture intensity, Wavg is the average fracture width, and i, j, and k are local directions for each grid cell of the dual porosity reservoir model.

13. The system of claim 9, wherein the fracture network characterization tool calibrates the base intensity data to the HFT fracture intensity using the following equation:

$$HFint(i,j,k) = A * MSint(i,j,k),$$

wherein HFint is the HFT fracture intensity, Msint is microseismic event intensity, A is a configurable correlation factor, and i, j, and k are local directions for each grid cell of the dual porosity reservoir model.

14. A computer readable storage medium storing instructions for creating a dual porosity reservoir model, the instructions when executed causing a processor to:
   estimate an average fracture width of a fracture network using one or more of net fracturing pressure, Poisson's ratio, shear modulus and fracture height;
   determine microseismic event envelope, microseismic event intensity, and natural fracture intensity using a three-dimensional geomodel comprising microseismic event data;

determine hydraulic fracturing treatment (HFT) fracture intensity of post-hydraulic fracturing treatment (post-HFT) based on the average fracture width and HFT volume data;

calibrate the microseismic intensity to the HFT fracture intensity to obtain calibrated HFT fracture intensity; and generate the dual porosity reservoir model based on the calibrated HFT fracture intensity.

15. The non-transitory computer readable storage medium of claim 14, the instructions further causing the processor to:

generate a proppant transportation and distribution scenario for the dual porosity reservoir model, wherein the proppant transportation and distribution scenario is generated based on at least one of a group consisting of the HFT fracture intensity, permeability, and fracture conductivity;

derive a set of equations to link the HFT fracture intensity and the average fracture width to parameters of the dual porosity model;

history matching the parameters of the dual porosity model with production data, wherein the dual porosity model comprises uncertainties for the set of equations that are fine tuned to the production data during subsequent simulation runs of the dual porosity model; and perform field operations based on the proppant transportation and distribution scenario.

16. The non-transitory computer readable storage medium of claim 15, wherein the permeability is calculated using the following equation:

$$Kfx = HFintx * Kf * Wavg,$$

wherein HFintx is x-directional HFT fracture intensity, Kf is fracture permeability, Wavg is the average fracture width, and Kfx is x-directional network permeability.

17. The non-transitory computer readable storage medium of claim 14, wherein the microseismic event intensity is determined based on microseismic event counts per unit volume of the microseismic event data.

18. The non-transitory computer readable storage medium of claim 14, wherein the microseismic event intensity comprises at least one selected from a group of signal noise ratio, amplitude, cloud volume, and a fracture interpretation.

19. The non-transitory computer readable storage medium of claim 14, wherein the HFT fracture intensity is determined based on the average fracture width and HFT volume data using the following equation:

$$V\text{slurry} = \Sigma HFint(i,j,k) * Vbulk(i,j,k) * Wavg,$$

wherein Vslurry is a total slurry volume of fracturing fluid, Vbulk is a 3D geomodel grid cell bulk volume of the dual porosity reservoir model, HFint is the HFT fracture intensity, Wavg is the average fracture width, and i, j, and k are local directions for each grid cell of the dual porosity reservoir model.

20. The non-transitory computer readable storage medium of claim 14, wherein the microseismic event intensity is calibrated to the HFT fracture intensity using the following equation:

$$HFint(i,j,k) = A * MSint(i,j,k),$$

wherein HFint is the HFT fracture intensity, MSint is the microseismic event intensity, A is a configurable correlation factor, and i, j, and k are local directions for each grid cell of the dual porosity reservoir model.

* * * * *